US011899693B2

(12) United States Patent
Chan et al.

(10) Patent No.: US 11,899,693 B2
(45) Date of Patent: Feb. 13, 2024

(54) TRAIT EXPANSION TECHNIQUES IN BINARY MATRIX DATASETS

(71) Applicant: Adobe Inc., San Jose, CA (US)

(72) Inventors: Yeuk-yin Chan, Santa Clara, CA (US); Tung Mai, San Jose, CA (US); Ryan Rossi, Santa Clara, CA (US); Moumita Sinha, Cupertino, CA (US); Matvey Kapilevich, New York, NY (US); Margarita Savova, Jersey City, NJ (US); Fan Du, Malpitas, CA (US); Charles Menguy, New York, NY (US); Anup Rao, San Jose, CA (US)

(73) Assignee: Adobe Inc., San Jose, CA (US)

( * ) Notice: Subject to any disclaimer, the term of this patent is extended or adjusted under 35 U.S.C. 154(b) by 54 days.

(21) Appl. No.: 17/677,323

(22) Filed: Feb. 22, 2022

(65) Prior Publication Data

US 2023/0267132 A1 Aug. 24, 2023

(51) Int. Cl.
*G06F 16/00* (2019.01)
*G06F 16/28* (2019.01)

(52) U.S. Cl.
CPC .................. *G06F 16/285* (2019.01)

(58) Field of Classification Search
CPC .................................................. G06F 16/285
USPC ........................................................ 707/739
See application file for complete search history.

(56) References Cited

U.S. PATENT DOCUMENTS

| 9,965,524 | B2 * | 5/2018 | Fuchs | G06F 16/2465 |
| | | | | 707/707 |
| 2015/0261793 | A1 * | 9/2015 | Sheng | G06F 16/21 |
| | | | | 707/803 |
| 2016/0191639 | A1 * | 6/2016 | Dai | H04L 67/306 |
| | | | | 709/204 |
| 2016/0300019 | A1 * | 10/2016 | Baluta | G06F 16/285 |
| | | | | 707/707 |

(Continued)

OTHER PUBLICATIONS

"Acting on Insight Requires an Audience", Available online at https://business.adobe.com/in/products/audience-manager/adobe-audience-manager.html, Accessed from Internet on Nov. 5, 2021, pp. 1-5.

(Continued)

*Primary Examiner* — Alexandria Y Bromell
(74) *Attorney, Agent, or Firm* — Kilpatrick Townsend & Stockton LLP

(57) ABSTRACT

A cluster generation system identifies data elements, from a first binary record, that each have a particular value and correspond to respective binary traits. A candidate description function describing the binary traits is generated, the candidate description function including a model factor that describes the data elements. Responsive to determining that a second record has additional data elements having the particular value and corresponding to the respective binary traits, the candidate description function is modified to indicate that the model factor describes the additional elements. The candidate description function is also modified to include a correction factor describing an additional binary trait excluded from the respective binary traits. Based on the modified candidate description function, the cluster generation system generates a data summary cluster, which includes a compact representation of the binary traits of the data elements and additional data elements.

20 Claims, 8 Drawing Sheets

(56) References Cited

U.S. PATENT DOCUMENTS

| | | | | |
|---|---|---|---|---|
| 2016/0306922 | A1* | 10/2016 | van Rooyen | G16B 50/30 707/707 |
| 2018/0157561 | A1* | 6/2018 | Venkatesh | G06F 3/0665 707/707 |
| 2019/0220284 | A1* | 7/2019 | Gupta | G06F 9/3861 707/707 |
| 2019/0370254 | A1* | 12/2019 | Maxwell | G06F 16/221 707/707 |
| 2020/0310804 | A1* | 10/2020 | Hughes | G06F 9/3455 707/707 |
| 2021/0342785 | A1* | 11/2021 | Mann | G06T 11/206 707/707 |
| 2022/0116265 | A1* | 4/2022 | Boyle, III | H04L 41/064 707/707 |

OTHER PUBLICATIONS

"Back to Basics: What is Look-alike Modeling?", Available online at https://www.lotame.com/back-basics-look-alike-modeling/, May 6, 2018, pp. 1-10.

"Innovate and Automate Fast with AI Across Salesforce", Available online at https://www.salesforce.com/in/products/einstein/overview/, Accessed from Internet on Nov. 5, 2021, pp. 1-4.

Ahn et al., "Link Communities Reveal Multiscale Complexity in Networks", Nature, vol. 466, 7307, Sep. 14, 2010, 21 pages.

AMER-YAHIA, "Human Factors in Data Science", International Council for Open and Distance Education, 2018, pp. 1-12.

Arlia et al., "Experiments in Parallel Clustering with DBSCAN", Proceedings of the 7th International Euro-Par Conference Manchester on Parallel Processing, Available online at http://groups.di.unipi.it/~coppola/didattica/ccp0506/papers/LNCS2150_21500326.pdf, Aug. 2001, pp. 326-331.

Bagherjeiran et al., "Large-Scale Customized Models for Advertisers", Proceedings of the 2010 IEEE International Conference on Data Mining Workshops, Dec. 2010, pp. 1029-1036.

Bindra et al., "Distributed Big Advertiser Data Mining", International Conference on Data Mining Workshops, 2012, 1 page.

Bohm et al., "Density-Based Clustering using Graphics Processors", Proceedings of the 18th ACM Conference on Information and Knowledge Management, Nov. 2009, pp. 661-670.

Cavallo et al., "Clustrophile 2: Guided Visual Clustering Analysis", IEEE Transactions on Visualization and Computer Graphics, vol. 25, No. 1, Sep. 8, 2018, pp. 267-276.

Chan et al., "Real-Time Clustering for Large Sparse Online Visitor Data", Proceedings of The Web Conference 2020, Apr. 2020, pp. 1049-1059.

Chan et al., "VIBR: Visualizing Bipartite Relations at Scale with the Minimum Description Length Principle", IEEE Transactions on Visualization and Computer Graphics, vol. 25, No. 1, Jan. 2019, pp. 321-330.

Cotta et al., "Off-Policy Evaluation of Probabilistic Identity Data in Lookalike Modeling", Proceedings of the Twelfth ACM International Conference on Web Search and Data Mining, Available online at https://arxiv.org/pdf/1901.05560.pdf, Jan. 4, 2019, pp. 483-491.

Cui et al., "Geometry-based Edge Clustering for Graph Visualization", IEEE Transactions on Visualization and Computer Graphics, vol. 14, No. 6, Nov. 2008, pp. 1277-1284.

Dewet et al., "Finding Users Who Act Alike: Transfer Learning for Expanding Advertiser Audiences", Proceedings of the 25th ACM SIGKDD International Conference on Knowledge Discovery & Data Mining, Available online at https://dl.acm.org/doi/pdf/10.1145/3292500.3330714, Aug. 4-8, 2019, pp. 2251-2259.

Dhillon et al., "A Data-Clustering Algorithm on Distributed Memory Multiprocessors", In Large-scale Parallel Data Mining, May 2002, pp. 245-260.

Dhillon, "Co-Clustering Documents and Words using Bipartite Spectral Graph Partitioning", Proceedings of the seventh ACM SIGKDD international Conference on Knowledge Discovery and Data Mining, Aug. 2001, pp. 269-274.

Doan et al., "Adversarial Factorization Autoencoder for Look-alike Modeling", Proceedings of the 28th ACM International Conference on Information and Knowledge Management, Available online at https://dl.acm.org/doi/pdf/10.1145/3357384.3357807, Nov. 3-7, 2019, pp. 2803-2812.

Du et al., "Visual Interfaces for Recommendation Systems: Finding Similar and Dissimilar Peers", ACM Transactions on Intelligent Systems and Technology, vol. 10, No. 1, Nov. 2018, pp. 1-23.

Foti et al., "Scalable Parallel Clustering for Data Mining on Multicomputers", Lecture Notes in Computer Science, vol. 1800, May 2000, 9 pages.

Gu et al., "Module Overlapping Structure Detection in PPI Using an Improved Link Similarity-Based Markov Clustering Algorithm", Neural Computing and Applications, vol. 31, No. 5, May 19, 2018, 10 pages.

Heer et al., "Design Considerations for Collaborative Visual Analytics", Information Visualization, vol. 7, No. 1, Feb. 21, 2008, pp. 49-62.

Jeong et al., "iPCA: An Interactive System for PCA-Based Visual Analytics", Computer Graphics Forum, vol. 28, No. 3, Jun. 2009, 8 pages.

Kanagal et al., "Focused Matrix Factorization for Audience Selection in Display Advertising", Available online at https://static.googleusercontent.com/media/research.google.com/en//pubs/archive/40489.pdf, Apr. 2013, pp. 1-12.

Keim et al., "Visual Analytics: Definition, Process, and Challenges", Information Visualization, Mar. 2008, pp. 154-175.

Keim et al., "Visual Analytics: Scope and Challenges", Visual Data Mining, No. 4404, 2008, pp. 76-90.

Kim et al., "Detecting Overlapping and Hierarchical Communities in Complex Network Using Interaction-Based Edge Clustering", Physica A: Statistical Mechanics and its Applications, vol. 417, Jan. 2015, pp. 46-56.

Ko et al., "Incremental Lossless Graph Summarization", Knowledge Discovery and Data Mining, Available Online at: https://arxiv.org/pdf/2006.09935.pdf, Jun. 17, 2020, 11 pages.

Kwon et al., "Clustervision: Visual Supervision of Unsupervised Clustering", Transactions on Visualization and Computer Graphics, vol. 24, No. 1, Aug. 29, 2017, 10 pages.

Lee et al., "iVisClustering: An Interactive Visual Document Clustering via Topic Modeling", Computer Graphics Forum, vol. 31, No. 3, Jun. 2012, pp. 1155-1164.

Lee et al., "SSumM: Sparse Summarization of Massive Graphs", Available Online at: https://arxiv.org/pdf/2006.01060.pdf, Feb. 21, 2021, 11 pages.

Li et al., "Yahoo Audience Expansion: Migration from Hadoop Streaming to Spark", Proceeding of the Spark Summit, 2013.

Liu et al., "Audience Expansion for Online Social Network Advertising", Proceedings of the 22nd ACM SIGKDD International Conference on Knowledge Discovery and Data Mining, Aug. 13-17, 2016, 10 pages.

Ma et al., "A Sub-Linear, Massive-Scale Look-Alike Audience Extension System", JMLR: Workshop and Conference Proceedings, vol. 53, 2016, 16 pages.

Ma et al., "Score Look-Alike Audiences", Data Mining Workshops (ICDMW), 2016 IEEE 16th International Conference on, IEEE, Dec. 2016, 10 pages.

Mangalampalli et al., "A Feature-Pair-Based Associative Classification Approach to Look-Alike Modeling for Conversion-Oriented User-Targeting in Tail Campaigns", Proceedings of the 20th International Conference Companion on World Wide Web, Mar. 28-Apr. 1, 2011, pp. 85-86.

Navlakha et al., "Graph Summarization with Bounded Error", Proceedings of the ACM SIGMOD International Conference on Management of Data, SIGMOD 2008, 2008, pp. 419-431.

Nguyen et al., "One-Pass Logistic Regression for Label-Drift and Large-Scale Classification on Distributed Systems", ICDM 2016: Proceedings of the 16th International Conference on Data Mining, Dec. 12-15, 2016, pp. 1113-1118.

Popov et al., "Adaptive Look-Alike Targeting in Social Networks Advertising", Procedia Computer Science, vol. 136, 2018, pp. 255-264.

(56) References Cited

OTHER PUBLICATIONS

Rajaraman et al., "Mining of Massive Datasets", Available Online at: http://infolab.stanford.edu/~ullman/mmds/book.pdf, 2011, 513 pages.

Ramesh et al., "Audience Segment Expansion Using Distributed In-Database K-Means Clustering", ADKDD '13, Proceedings of the Seventh International Workshop on Data Mining for Online Advertising, Aug. 2013, 9 pages.

Rissanen, "Modeling by Shortest Data Description", Automatica, vol. 14, No. 5, Sep. 1978, pp. 465-471.

Schaub et al., "Flow Smoothing and Denoising: Graph Signal Processing in the Edge-Space", GlobalSIP, IEEE, Aug. 6, 2018, pp. 735-739.

Schreck et al., "Visual Cluster Analysis of Trajectory Data with Interactive Kohonen Maps", Information Visualization, vol. 8, No. 1, Feb. 12, 2009, pp. 14-29.

Shen et al., "Effective Audience Extension in Online Advertising", Proceedings of the 21th ACM SIGKDD International Conference on Knowledge Discovery and Data Mining, Aug. 2015, pp. 2099-2108.

Shi et al., "A Link Clustering Based Overlapping Community Detection Algorithm", Data & Knowledge Engineering, vol. 87, Sep. 2013, pp. 1-11.

Solava et al., "Graphlet-Based Edge Clustering Reveals Pathogen-Interacting Proteins", Bioinformatics, vol. 28, No. 18, Sep. 15, 2012, pp. i480-i486.

Wang et al., "Discovering Overlapping Groups in Social Media", The 10th IEEE International Conference on Data Mining, Dec. 2010, 11 pages.

Wenskovitch et al., "Towards a Systematic Combination of Dimension Reduction and Clustering in Visual Analytics", IEEE Transactions on Visualization and Computer Graphics, vol. 24, No. 1, 2017, pp. 131-141.

Zhang et al., "Implicit Look-Alike Modelling in Display Ads—Transfer Collaborative Filtering to CTR Estimation", European Conference on Information Retrieval (ECIR), Jan. 11, 2016, pp. 589-601.

Zhao et al., "Parallel K-Means Clustering Based on MapReduce", Proceedings of the 1st International Conference on Cloud Computing, 2009, pp. 674-679.

Zhou et al., "Energy-Based Hierarchical Edge Clustering of Graphs", 2008 IEEE Pacific Visualization Symposium, Apr. 2008, pp. 55-61.

Zhuang et al., "Hubble: An Industrial System for Audience Expansion in Mobile Marketing", KDD '20: Proceedings of the 26th ACM SIGKDD International Conference on Knowledge Discovery & Data Mining, Aug. 23-27, 2020, pp. 2455-2463.

\* cited by examiner

TRAIT EXPANSION TECHNIQUES IN BINARY MATRIX DATASETS

TECHNICAL FIELD

This disclosure relates generally to the field of binary data summarization, and more specifically relates to trait identification in binary matrix datasets.

BACKGROUND

Identifying similar records in a dataset can provide analytical insights about the described data. In very large datasets, such as datasets with millions or billions of data elements, expansion analysis techniques can assist a user who desires to identify data records within the datasets. For example, a technician who is seeking data records that are similar to a particular set of seed record might provide query information describing a small number of traits for the seed records. Based on the query information, an expansion analysis system can attempt to interact with the very large dataset to identify data records that are similar to the seed records.

However, existing techniques for expansion analysis can limit or interfere with requests entered by technicians or other users of a contemporary expansion analysis system. In some cases, contemporary expansion analysis techniques may lack scalability, requiring a large amount of computing resources to analyze a dataset that includes about one thousand records with several thousand traits per record. In addition, existing techniques to identify similar records may require hours or days to analyze a very large dataset. For example, a contemporary expansion analysis system may return a response hours or days after a user enters the query, causing frustration for the user and potentially delaying research or other applications of the query results. If the user desires to enter several queries for various combinations of traits or various seed records, it may be infeasible for the user to wait hours or days for individual responses for each of the queries.

It is desirable to develop trait expansion techniques that are highly interactive, allowing a user to rapidly (e.g., within 1-5 sec) receive responses to multiple queries.

SUMMARY

According to certain embodiments, a system includes a cluster generation component, and a datastore. The datastore includes a set of binary records. Each record in the set of binary records includes multiple data elements that correspond to binary traits. The cluster generation component is configured for identifying a first group of data elements in a first record from a group of binary records. Each data element in the first group of data elements includes a first value. Each data element in the first group of data elements corresponds to a respective binary trait. The cluster generation component is configured for generating a candidate description function that describes the respective binary traits. The candidate description function includes a model factor that describes the first group of data elements of the first record. The cluster generation component is configured for modifying the candidate description function to indicate that the model factor describes a second group of data elements of a second record, responsive to determining that the second record has a second group of data elements corresponding to the respective binary trait. Each data element in the second group of data elements includes the first value. The cluster generation component is configured for modifying the candidate description function to include a correction factor, responsive to determining that the second record has an additional data element. The additional data element corresponds to an additional binary trait that is excluded from the respective binary traits. The correction factor describes the additional data element of the second record. The cluster generation component is configured for generating a data summary cluster based on the modified candidate description function. The data summary cluster includes a compact representation of the respective binary traits corresponding to the first group of data elements and second group of data elements. The cluster generation component is configured for providing the data summary cluster to a trait expansion query system. The trait expansion query system is configured for modifying the data summary cluster to identify an expansion trait associated with a subset of the set of binary data records.

According to certain embodiments, query data is received via a user interface. The query data identifies a seed population record and a target population trait. The seed population record is selected from a group of population records. A first data summary cluster and a second data summary cluster are identified, based on the seed population record, from a set of data summary clusters. Each of the first and second data summary clusters includes a compact representation of the target population trait. Responsive to determining that the first and second data summary clusters include an overlapping set of data elements, the first data summary cluster is modified to include an additional data element from the second data summary cluster. An expansion trait, which is represented by the modified first data summary cluster, is identified. A score is calculated for each respective population record included in the group of population records. The score indicates a similarity of the expansion trait to a group of additional population traits associated with the respective population record. A display device is updated to display a graphical representation of each score associated with each respective population record.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
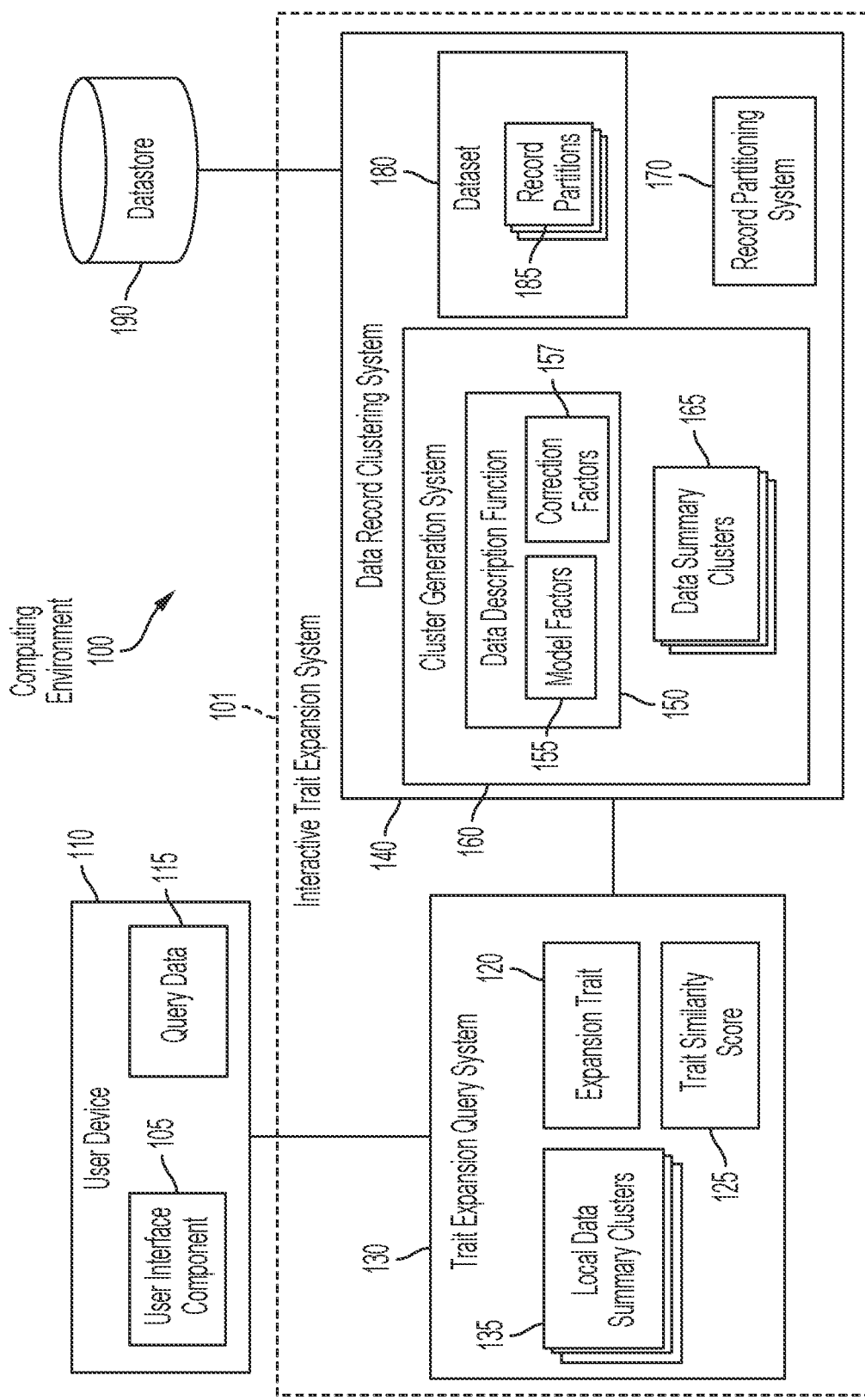
FIG. 1 is a diagram depicting an example of a computing environment in which an interactive trait expansion system identifies one or more expansion traits associated with query data, according to certain embodiments.

As discussed above, prior techniques for expansion analysis do not provide interactive query responses within a useful timeframe for a user. In addition, a contemporary expansion analysis system may lack scalability, requiring a relatively large amount of computing resources (e.g., memory, processing capacity) to apply a query to a very large dataset. Certain embodiments described herein provide for an interactive trait expansion system that is capable of returning query results for a very large dataset within a small amount of time, such as about 1-5 seconds per query. The example interactive trait expansion system can include a trait expansion query system with which a user device interacts. The trait expansion query system could receive from the user device multiple expansion queries about a very large dataset. To determine responses to the queries, the trait expansion query system analyzes data summary clusters that describe compact representations of the very large dataset. In the example interactive trait expansion system, the data summary clusters are generated by a data record clustering system. Based on efficient and quick analysis of the data summary clusters, the trait expansion query system determines responses to the multiple queries in a relatively short amount of time, such that the user device receives and displays the responses without a delay noticeable by a person using the user device. The person, such as a researcher or a data technician, may have a more satisfying user experience with the quick response time of the example interactive trait expansion system, as compared to a contemporary expansion analysis system. In addition, the example interactive trait expansion system may scale with relative ease as compared to a contemporary expansion analysis system, providing query results for a very large dataset (e.g., thousands of records, each record having thousands of data elements) in a similar time frame as a query on a mid-size or small dataset (e.g., about one hundred records each having several hundred data elements).

The following examples are provided to introduce certain embodiments of the present disclosure. In this example, an interactive trait expansion system generates one or more data summary clusters that represent information from a very large binary dataset. For instance, the very large binary dataset could include data records representing chemical compounds, login attempts, website visitor behavior, or any other suitable entity about which data can be gathered. In this example, information in the binary dataset is represented as binary data, such as binary data value pairs of I/O, true/false, or other types of binary data values. A data record clustering system in the interactive trait expansion system partitions the binary dataset into a group of record partitions that include groups of data records from the binary dataset. A cluster generation system in the interactive trait expansion system identifies, for each of the partitions, a data description function and one or more data summary clusters. The data description function includes a compact representation of data included in the particular partition, such as compact representations in one or more model factors or correction factors. For the particular partition, each model factor and each correction factor is represented by a respective one of the data summary clusters. In this example, the data record clustering system employs parallelization techniques to identify respective data description functions and data summary clusters for each of the partitions in parallel.

Continuing with this example, a trait expansion query system in the interactive trait expansion system receives query data, such as from a user device. The query data indicates, for instance, data describing a seed record and a target trait from the very large binary dataset. In addition, the query data includes a request for expansion data based on the seed record and target trait. Responsive to the query data, the trait expansion query system accesses and modifies the data summary clusters generated by the data record clustering system. The trait expansion query system identifies at least one expansion trait, such as a trait for expansion, based on the modified data summary clusters. Based on the expansion trait, the trait expansion query system calculates, for additional records in the binary dataset, respective similarity scores that indicate a similarity of traits included in the additional records with the expansion trait. The trait expansion query system provides, in response to the request for expansion data, data describing the similarity scores and the expansion trait.

Certain embodiments described herein provide improved techniques for facilitating interactive trait expansion analysis in an online environment. For example, a data cluster generation system described herein generates data clusters from a very large dataset by applying particular rules, such as techniques to generate data description functions or to partition the very large dataset. In some implementations, a trait expansion query system described herein analyzes the data clusters more efficiently and quickly, as compared to contemporary techniques for expansion analysis. Additionally or alternatively, the trait expansion query system receives and responds to query data based on the efficient and quick analysis of the data clusters, reducing time spent by a person waiting for query responses and reducing user frustration, as compared to contemporary techniques for expansion analysis.

Referring now to the drawings, FIG. 1 depicts an example of a computing environment 100 in which an interactive trait expansion system 101 identifies one or more expansion traits associated with query data. The interactive trait expansion system 101 includes a trait expansion query system 130 and a data record clustering system 140. In some cases, the computing environment 100 includes one or more user devices, such as a user device 110, that are configured to communicate with one or more of the trait expansion query system 130 or the data record clustering system 140. Additionally or alternatively, the computing environment 100 includes one or more data storage components, such as a datastore 190, that are configured to communicate with one or more of the trait expansion query system 130 or the data record clustering system 140. FIG. 1 depicts the datastore 190 as a component that is external to the interactive trait expansion system 101, but other implementations are possible, such as data storage components that are included within an interactive trait expansion system. In some cases, multiple ones of the data record clustering system 140, the record partitioning system 170, the cluster generation system 160, or the trait expansion query system 130 are implemented as components within a particular computing system, such as software modules that operate on one or more memory components of a computing system. Additionally or alternatively, one or more of the data record clustering system 140, the record partitioning system 170, the cluster generation system 160, or the trait expansion query system 130 are implemented as particular computing systems, such as separate computing systems that are configured to communicate via a computing network.

In some embodiments, one or more components of the interactive trait expansion system 101 access one or more datasets in the datastore 190. For example, the data record clustering system 140 accesses a dataset 180. In the computing environment 100, the dataset 180 is a binary dataset. As described herein, a "binary dataset" is a dataset that includes data elements having binary data values, such as data elements with values for I/O, true/false, or other suitable binary data value pairs. Additionally or alternatively, the dataset 180 is a very large dataset. As described herein, a "very large dataset" is a dataset that includes thousands (or more) of data records, each record of which includes thousands (or more) of data elements. In some examples described herein, a very large binary dataset includes records and data elements that are configured as a matrix, such as records that are arranged as rows in the matrix and data elements that are arranged as columns in the matrix. In some examples described herein, a very large binary dataset includes records (e.g., rows) that represent entities and data elements (e.g., columns) that represent traits of the entities. Examples of entities can include records representing chemical compounds, login attempts, website visitor behavior, or any other suitable entity about which data can be gathered. Additionally or alternatively, examples of traits can include data elements representing traits for entities, such as whether a particular chemical compound includes a hydroxyl group, whether a particular login attempt originated from an international location, whether a particular website visitor interacted with a news article, or any other suitable trait about an entity. In some cases, a data element associated with a particular trait includes a value 1 if the particular trait is exhibited by the entity (e.g., the chemical compound includes a hydroxyl group) or a value 0 if the particular trait is not exhibited by the entity (e.g., the chemical compound does not include a hydroxyl group).

In FIG. 1, the data record clustering system 140 generates one or more partitions of the dataset 180, such as record partitions 185. For example, a record partitioning system 170 in the data record clustering system 140 identifies groups of binary records from the dataset 180. Each of the record partitions 185 includes a respective set of the binary records identified by the record partitioning system 170. In some cases, the record partitioning system 170 uses one or more hashing techniques, such as locality sensitive hashing ("LSH") techniques, to generate the record partitions 185. Additionally or alternatively, the record partitioning system 170 identifies sets of binary records that have equivalent or approximately equivalent size, such that each of the record partitions 185 includes a same or approximately same quantity of records (e.g., about 100 records per partition, about 5% of total dataset records per partition). In some cases, efficiency of the data record clustering system 140 may be improved based on the record partitions 185 having approximately the same quantity of records. For example, the data record clustering system 140 could utilize parallelization techniques to analyze the approximately equivalent record partitions 185 with improved efficiency, e.g., more efficient use of computing resources. In some cases, the interactive trait expansion system 101 includes or is configured to communicate with one or more parallel computing resources (e.g., processors, remote computing clusters, virtual machines, cloud computing resources) capable of performing parallel analysis of, for example, the record partitions 185.

In some embodiments, the data record clustering system 140 includes a cluster generation system 160. The cluster generation system 160 identifies one or more groups of data elements from the dataset 180, such as a group of data elements from a particular one of the record partitions 185. In an identified group of data elements, each data element has a particular value, such as a value "1" indicating that an entity represented by the respective record has the trait represented by the respective data element. A particular group of data elements could be included in one or more records, such as data elements that are similar (e.g., have a same value) across multiple records. In some cases, each group of data elements includes a particular trait (or traits) that have a same value in multiple records. For example, if a set of multiple records, e.g., representing login attempts, have data elements with a particular value indicating whether each of the multiple records has a particular trait, e.g., the login attempt originates more than 500 km from the requested system, the cluster generation system 160 could identify, as a group, the data elements having the particular value.

Additionally or alternatively, the cluster generation system 160 generates one or more data description functions, such as a data description function 150. The data description function 150 includes one or more model factors, such as model factors 155. Each of the model factors 155 describes a respective group of data elements having a particular value. Additionally or alternatively, the data description function 150 includes one or more correction factors, such as correction factors 157. Each of the correction factors 157 describes a respective data element (or elements) with a particular value, where the respective data element is unrepresented by the model factors 155. For example, if a particular record from the dataset 180 has a data element value (e.g., representing a trait of the particular record) that is not included in an additional record, the cluster generation system 160 could generate a correction factor that represents the data element of the particular record. In some cases, the data description function 150 is a compact representation of the dataset 180. For example, the cluster generation system 160 performs one or more techniques to minimize a length of the data description function 150, such as by minimizing a quantity of the model factors 155 and the correction factors 157 that represent particular values in the dataset 180.

Based on the data description function 150, the cluster generation system 160 generates one or more data summary clusters, such as data summary clusters 165. In some cases, each cluster in the data summary clusters 165 corresponds to a particular model factor of the model factors 155. Additionally or alternatively, each cluster in the data summary clusters 165 includes a compact representation of the respective group of data elements represented by the corresponding model factor. As described herein, a "compact representation" of data elements includes data describing one or more traits that are shared (e.g., have a same value) by a quantity of binary data records. In some examples herein, a compact representation of a group of data elements indicates a trait or traits that correspond to the group of data elements.

Additionally or alternatively, some described examples of compact representations omit data identifying particular records that have the indicated traits. Using the above example set of multiple records representing login attempts, the cluster generation system 160 could generate a particular data summary cluster that includes a compact representation of the data elements indicating the particular login attempt distance trait. For instance, the particular data summary cluster could include compact data describing that the particular login attempt distance trait is shared by a quantity of n data records (i.e., the quantity of records in the example set). Additionally or alternatively, the particular data summary cluster could omit identification data describing which records are included in the example set. In some cases, a data summary cluster that includes compact representation data is of relatively small size, as compared to the respective group of data elements or corresponding binary records that are described by the data summary cluster. In addition, a data summary cluster that includes compact representation data could be more efficiently stored or analyzed (e.g., requiring fewer computing resources), as compared to the respective group of data elements or corresponding binary records that are described by the data summary cluster.

In the interactive trait expansion system 101, the trait expansion query system 130 accesses the data summary clusters 165. In some cases, the trait expansion query system 130 generates local copies of the clusters 165, such as local data summary clusters 135. Additionally or alternatively, the trait expansion query system 130 modifies (or generates) the local data summary clusters 135 based on query data. For example, the trait expansion query system 130 receives, from the user device 110, query data 115. In some cases, the user device 110 generates the query data 115 based on inputs that are received via a user interface component 105 that is included in (or otherwise configured to communicate with) the user device 110. The query data 115 identifies one or more seed population records. Each seed population record may describe a respective entity that is associate with one or more traits, such as a particular binary record selected from the dataset 180. Additionally or alternatively, the query data 115 identifies one or more target population traits. Each target population trait may describe a particular trait, such as a particular trait corresponding to data elements (e.g., a column) in the dataset 180. In the query data 115, an identified seed population record may, but need not, exhibit an identified target population traits. In some cases, the seed population records or the target population traits may be selected from a dataset, such as the dataset 180 or another dataset. In some cases, the seed population records or the target population traits may be generated from data describing potential characteristics, such as a table (or other data structure) that describes potential entities or potential traits.

In FIG. 1, the trait expansion query system 130 receives the query data 115. Based on the seed population records and the target population traits, the trait expansion query system 130 identifies, in the local data summary clusters 135, one or more clusters that include a compact representation of the target population trait. The trait expansion query system 130 may modify the one or more identified clusters. Additionally or alternatively, the trait expansion query system 130 identifies one or more expansion traits, such as an expansion trait 120, that are represented by the one or more identified clusters (or modified clusters). The trait expansion query system 130 calculates one or more scores respectively associated with one or more records from the dataset 180. The one or more scores, such as a trait similarity score 125, indicate a similarity of the expansion trait 120 with a group of additional traits that are associated with the respective record, e.g., traits that are exhibited by the entity described by the respective record.

For instance, using the above example set of multiple records representing login attempts, the query data 115 could identify a seed population record describing a particular login attempt, e.g., an attempt known to be fraudulent, and identify the login attempt distance trait as a target population trait. Based on the example seed population record and target population trait, the trait expansion query system 130 identifies, in the local data summary clusters 135, one or more clusters that describe the login attempt distance trait. In this example, the trait expansion query system 130 identifies, in the one or more clusters, at least one expansion trait. In this example, the at least one expansion trait includes the target population trait, e.g., login attempt distance, but in some implementations, an expansion trait may include an additional trait, e.g., not the target population trait. Continuing with the example, the trait expansion query system 130 calculates, for each particular record in the dataset 180 (or a subset of records), a trait similarity score that indicates a similarity of the expansion trait with additional traits that are associated with the particular record. For instance, trait similarity scores for each record in the dataset 180 could indicate how many of the records are similar (e.g., include similar traits) to the seed population record describing the fraudulent login attempt.

Figure 2:
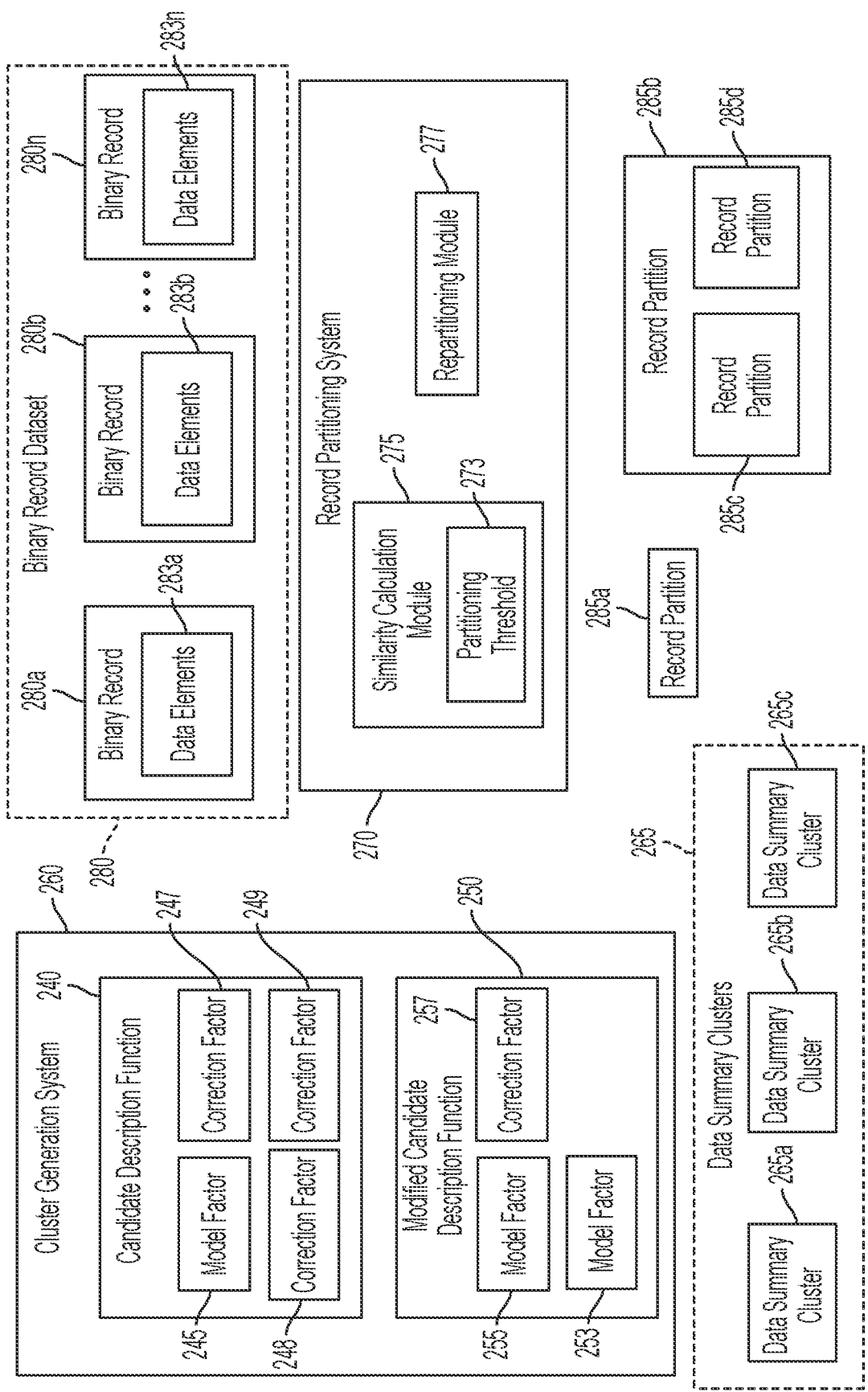
FIG. 2 is a diagram depicting an example of a data record clustering system, in an interactive trait expansion system, that is configured to generate one or more data summary clusters, according to certain embodiments.

In some implementations, an interactive trait expansion system, such as the interactive trait expansion system 101, includes a data record clustering system that is configured to generate data summary clusters that represent data elements in a very large binary dataset. FIG. 2 depicts an example of a data record clustering system 200 that is configured to generate one or more data summary clusters. In some cases, the data record clustering system 200 is included in an interactive trait expansion system, such as the interactive trait expansion system 101. The data record clustering system 200 includes one or more of a record partitioning system 270 or a cluster generation system 260. In some cases, the record partitioning system 270 and the cluster generation system 260 are implemented as components within a particular computing system, such as software modules that operate on one or more memory components of a computing system. Additionally or alternatively, one or more of the record partitioning system 270 or the cluster generation system 260 are implemented as particular computing systems, such as separate computing systems that are configured to communicate via a computing network.

The data record clustering system 200 includes a binary record dataset 280. In some cases, the binary record dataset 280 is a very large binary dataset, such as the dataset 180 described in regard to FIG. 1. For example, the data record clustering system 200 receives (or otherwise accesses) the binary record dataset 280 via a datastore, e.g., the datastore 190. The binary record dataset 280 includes multiple binary records, such as a binary record 280a, a binary record 280b, and additional binary records including a binary record 280n. Each of the binary records 280a-280n includes a respective set of data elements. For example, the binary record 280a includes a set of data elements 283a, the binary record 280b includes a set of data elements 283b, and the binary record 280n includes a set of data elements 283n. In FIG. 2, the binary records 280a-280n represent respective entities and the data elements 283a-283n include binary data values (e.g., I/O, true/false) that indicate a presence or absence of traits exhibited by the entities. In some cases, the binary record dataset 280 is a matrix data structure in which each of the binary records 280a-280n is arranged as a row and each of the data elements 283a-283n is arranged as an entry in a row and a column, e.g., columns corresponding to respective traits.

In FIG. 2, the record partitioning system 270 generates one or more partitions of the binary record dataset 280, such as a record partition 285a, a record partition 285b, a record partition 285c, and a record partition 285d (collectively referred to herein as record partitions 285). Each of the record partitions 285 includes a subset of records from the dataset 280. In some cases, a particular subset of records for a particular partition is identified based on a similarity among the records in the particular subset. For example, the record partitioning system 270 includes a similarity calculation module 275. The similarity calculation module 275 calculates a similarity among records within a group of records. For example, the similarity calculation module 275 selects a group of two or more records from the binary record dataset 280. Additionally or alternatively, the similarity calculation module 275 calculates a similarity metric for the group of records (e.g., pairwise similarity, groupwise similarity). Based on the similarity for the group of records, the similarity calculation module 275 determines whether the group of records (or a portion of the group) is included in a particular one of the record partitions 285. For example, the similarity calculation module 275 compares the calculated similarity metric to a partitioning threshold 273, and generates or modifies a partition responsive to determining that the group of records has a similarity that exceeds (or fulfills another relationship with) the partitioning threshold 273. In some cases, the similarity calculation module 275 calculates similarities among records by determining a Jaccard similarity for the records, but other similarity calculation techniques suitable for a binary matrix may be used. Additionally or alternatively, the similarity calculation module 275 calculates a hashing function for one or more records, such as by applying an LSH technique, a MinHash technique, or any other suitable hashing technique.

In some implementations, the record partitioning system 270 determines that at least one record partition of the dataset 280 has a size that is dissimilar from additional record partitions. For example, the record partitioning system 270 generates the record partition 285a and the record partition 285b responsive to calculating similarities among a first group of records, e.g., in the partition 285a, and similarities among a second group of records, e.g., in the partition 285b. Additionally or alternatively, the record partitioning system 270 determines that the record partitions 285a and 285b include quantities of records that are not equivalent or approximately equivalent. For instance, the record partition 285b includes a quantity of records that is approximately double (or another suitable relative size difference) a quantity of records included in the record partition 285a. Responsive to determining that at least one of the record partitions 285 has a size that is dissimilar, the record partitioning system 270 repartitions the records from the dataset 280, such as by generating one or more additional partitions or by combining one or more partitions. In some cases, the record partitioning system 270 includes a repartitioning module 277 that is configured to repartition the record partitions 285. For example, the repartitioning module 277 identifies a quantity of records in the record partitions 285a and 285b. Responsive to determining that the record partition 285b has a dissimilar size, e.g., is larger than the partition 285a, the repartitioning module 277 generates a repartitioning key for one or more records in the record partition 285b. For example, the repartitioning module 277 generates a random integer for each record in the partition 285, such as a random integer generated via a "salted hash" function. Based on the repartitioning keys, the repartitioning module 277 generates the record partition 285c and the record partition 285d from the records included in the partition 285b, such as by reassigning each record to the partition 285c or the partition 285d based on the respective repartitioning key for the record. In some cases, the combination of the record partition 285c and the record partition 285d includes all records included in the record partition 285b.

In FIG. 2, the cluster generation system 260 identifies one or more groups of data elements from the dataset 280. For example, the cluster generation system 260 identifies, within each of the record partitions 285, groups of data elements in which each data element has a particular value (e.g., a binary data value "1"). In some cases, the particular value indicates that the record corresponding to the data element includes the trait corresponding to the data element, e.g., the entity represented by the record exhibits the trait represented by the data element.

For each identified group of data elements, the cluster generation system 260 merges (or attempts to merge) the data elements within the group, such as by generating a model factor or a correction factor that describes the identified group of data elements. For example, the cluster generation system 260 identifies a set of data records that each include, for a particular set of traits, a first group of data elements that have the value 1. Additionally or alternatively, the cluster generation system 260 identifies an additional set of data records that each include, for the same particular set of traits, a second group of data elements that have the value 1. In this example, the cluster generation system 260 merges the first and second group of data elements, such as by generating (or modifying) a model factor that includes a compact representation of the merged group of data elements. In some cases, the cluster generation system 260 merges (or attempts to merge) groups of data elements that are included in multiple record partitions, such as record partitions generated via repartitioning of a particular partition having a relatively large size. For example, the cluster generation system 260 could merge groups of data elements that are included in the record partitions 285c and 285d, responsive to determining that the record partitions 285c and 285d are included in (e.g., are repartitioned from) the record partition 285b.

In some implementations, the cluster generation system 260 generates one or more data description functions based on the identified groups of data elements. Additionally or alternatively, the cluster generation system 260 calculates a cost factor associated with merging identified groups of elements. In some cases, a cost factor is calculated for a particular group of data elements. Additionally or alternatively, the cost factor for the particular group of data elements is calculated on a difference between a first quantity of model factors and correction factors that describe the particular group of data elements and a second quantity of model factors and correction factors that describe a modified version of the particular group of data elements, such as a modified group that includes an additional group of data elements. As an example, the cluster generation system 260 could identify a first group of data elements that is represented by a first combination of one model factor and two correction factors. The cluster generation system 260 could further identify a second group of data elements that is represented by a second combination of one model factor and zero correction factors. Additionally or alternatively, the cluster generation system 260 could calculate that a merged group including the first and second groups of data elements is represented by one model factor and two correction factors (e.g., the first and second groups have a same model factor). In this example, a cost factor associated with the merged group is a reduction of one, i.e., the merged representation of one model factor and two correction factors is has fewer factors than a combination of one model factor and two correction factors for the first group and one model factor for the second group. Responsive to identifying that the merged group is associated with a positive cost reduction, the cluster generation system 260 generates (or modifies) the merged group to include the data elements of the first and second groups.

In some implementations, the cluster generation system 260 generates multiple data description functions, such as during iterative operations related to identifying groups of data elements or calculating cost factors. Regarding the record partition 285*a*, for example, the cluster generation system 260 generates a candidate description function 240. The candidate description function 240 describes data elements that have a particular value, e.g., a binary value 1, in one or more records that are included in the record partition 285*a*. For example, the record partition 285*a* includes the binary record 280*a* and the binary record 280*b*. The candidate description function 240 includes a model factor 245, a correction factor 247, a correction factor 248, and a correction factor 249, that represent one or more data elements 283*a* having the particular value. For example, the model factor 245 represents a first group of the data elements 283*a*, and each of the correction factors 247, 248, and 249 represents a respective additional data element from the elements 283*a*. In some cases, the cluster generation system 260 generates a particular data description function (including candidate or modified candidate description functions) for a respective record partition, such as a data description function for the record partition 285*c* and an additional data description function for the record partition 285*d*. In some cases, the cluster generation system 260 merges multiple data descriptions functions, such as merging the data description functions for the partitions 285*c* and 285*d* to create a data description function describing the partition 285*b*, or merging the data description functions for each of the partitions 285 to create a data description function describing the binary record dataset 280.

Additionally or alternatively, the cluster generation system 260 identifies additional data elements in the record partition 285*a*, such as one or more of the data elements 283*b* having the particular value. In some cases, the cluster generation system 260 performs a merging analysis of the data elements 283*b* with respect to the data elements 283*a*. Additionally or alternatively, the cluster generation system 260 generates a modified candidate description function 250 that is based on the candidate description function 240 and the additional identified data elements. For example, the cluster generation system 260 identifies a second group of the data elements 283*b* having the particular value. Responsive to determining that the second group of the data elements 283*b* are associated with a same set of traits as the first group of the data elements 283*a*, the cluster generation system 260 generates a model factor 255 that represents a combination of the first group of the data elements 283*a* and the second group of the data elements 283*b*. In some cases, the cluster generation system 260 calculates a cost factor associated with the model factor 255, such as a cost factor indicating that representing the first and second groups via the model factor 255 is shorter (e.g., fewer factors) than representing the first group via the model factor 245 and the second group via an additional model factor. In some cases, the cluster generation system 260 generates the modified candidate description function 250 by adjusting data that is included in the candidate description function 240. For instance, the model factor 255 could be generated by modifying data of the model factor 245, such as by modifying metadata to indicate the factor describes the first and second groups of data elements. Additionally or alternatively, the cluster generation system 260 generates the model factor 255 as a particular data structure and removes (e.g., deletes) another data structure associated with the model factor 245.

Additionally or alternatively, the cluster generation system 260 identifies, in the record partition 285*a*, one or more groups of data elements that are represented via respective correction factors. In some cases, the cluster generation system 260 iteratively generates an aggregation of data elements represented via correction factors and identifies an additional group of data elements in the aggregation. For example, the cluster generation system 260 generates a data structure that aggregates the data elements that are represented via the correction factors 247, 248, and 249. Additionally or alternatively, the cluster generation system 260 identifies in the aggregation a third group of the data elements having the particular value, such as data elements represented via the correction factors 248 and 249. Responsive to identifying the third group of the data elements, the cluster generation system 260 generates a model factor 253 that represents the third group of the data elements from the aggregation. Additionally or alternatively, the cluster generation system 260 modifies (or generates) the modified candidate description function 250 to include the model factor 253 and omit the correction factors 248 and 249. In some cases, the cluster generation system 260 calculates a cost factor associated with the model factor 253, such as a cost factor indicating that representing the third group via the model factor 253 is shorter (e.g., fewer factors) than representing the respective data elements via the correction factors 248 and 249. In this example, the modified candidate description function 250 includes the correction factor 257, such as to represent an additional data element that is not included in an additional group of data elements.

In FIG. 2, the cluster generation system 260 generates one or more data summary clusters based on one or more data description functions. In some cases, each data summary cluster corresponds to a particular model factor or correction factor included in a data description function. For example, the cluster generation system 260 generates a group of data summary clusters 265 that correspond to factors included in the modified candidate description function 250. In the data summary clusters 265, a data summary cluster 265*a* corresponds to the model factor 255, a data summary cluster 265*b* corresponds to the model factor 253, and a data summary cluster 265*c* corresponds to the correction factor 257. In FIG. 2, each of the data summary clusters 265 includes a compact representation of the respective group of data elements represented by the corresponding model factor or corresponding correction factor. For example, the data summary cluster 265*a* includes a compact representation of the first and second groups of data elements for the model factor 255. In addition, the data summary cluster 265*b* includes a compact representation of the third group of data elements for the model factor 253. In addition, the data summary cluster 265*c* includes a compact representation of the additional data element for the correction factor 257. In some cases, the cluster generation system 260 generates one or more additional data summary clusters corresponding to additional model or correction factors. For example, additional data summary clusters could include respective compact representations for additional groups of data elements in some or all of the record partitions 285b-285d. Additionally or alternatively, at least one additional component in an interactive trait expansion system could access one or more of the data summary clusters 265 (or additional clusters). for example, the trait expansion query system 130 could access the data summary clusters 265, such as to create the local data summary clusters 135 or to otherwise respond to received query data.

In some cases, one or more components in the data record clustering system 200 utilizes one or more parallelization techniques to perform operations related to merging, cost factor analysis, or data summary cluster generation. For example, the cluster generation system 260 could include, or be configured to communicate with, multiple parallel computing resources. Additionally or alternatively, the cluster generation system 260 could generate a respective candidate description function for each of the record partition 285 based on operations performed by a respective parallel computing resources. For example, a first parallel computing resource could perform operations related to the record partition 285a, a second parallel computing resource could perform operations related to the record partition 285c, and a third parallel computing resource could perform operations related to the record partition 285d. In some cases, generating record partitions that have equivalent or approximately equivalent sizes can improve efficiency of computer resource usage in an interactive trait expansion system, such as by reducing idle time for parallel computing resources that have completed operations for smaller-sized partitions while a particular parallel resource performs operations for a partition having a relatively large size as compared to additional partitions.

Figure 3:
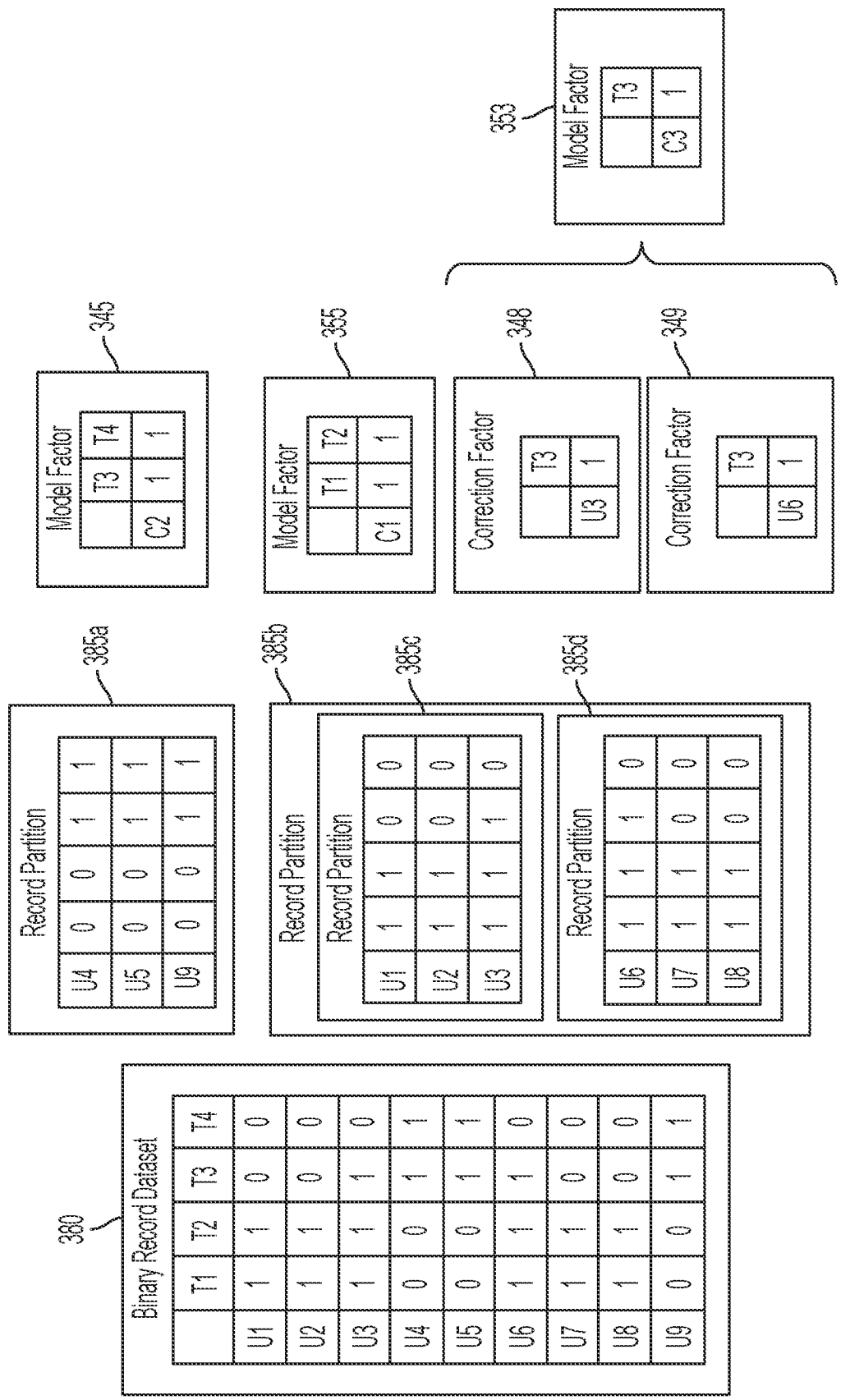
FIG. 3 is a diagram depicting examples of data structures that are utilized by one or more components of an interactive trait expansion system, according to certain embodiments.

FIG. 3 is a diagram depicting examples of data structures that are received, generated, modified, or otherwise used by one or more components of an interactive trait expansion system. For example, one or more components in the interactive trait expansion system 101 or the data record clustering system 200 may utilize one or more data structures represented in FIG. 3.

In FIG. 3, a binary record dataset 380 includes one or more data records, such as data records U1, U2, U3, U4, U5, U5, U7, U8, and U9. In FIG. 3, the data records U1-U9 are arranged as rows in the dataset 380. Each of the data records U1-U9 includes data elements, such as data elements that can be configured to include a binary value of 1 or 0 (or another suitable binary data value). In the binary record dataset 380, the data elements of the records U1-U9 correspond to traits represented by the dataset 380, such as traits T1, T2, T3, and T4. In some cases, the binary record dataset 380 includes one or more data records in addition to the records U1-U9. Additionally or alternatively, the binary record dataset 380 includes one or more traits in addition to the traits T1-T4. The additional traits can correspond to additional data elements of the data records U1-U9 or the additional data records. For example, the depicted portion of the binary record dataset 380 could be an excerpt of a very large binary dataset, such as a dataset including thousands (or more) records or traits.

In FIG. 3, the binary record dataset 380 is arranged as a binary matrix data structure. For example, the data records U1-U9 are arranged as rows in the dataset 380, and the traits T1-T4 are arranged as columns in the dataset 380. However, other implementations are possible, such as datasets that represent binary records as columns and traits as rows, datasets utilizing higher-dimensional data structures to represent records or traits, or other suitable data structures capable of representing binary records and traits.

In some implementations, a component of an interactive trait expansion system, such as a record partitioning system, generates or modifies one or more additional data structures based on the binary record dataset 380. For example, the record partitioning system 270 generates, based on the dataset 380, one or more record partitions, such as a record partition 385a, a record partition 385b, a record partition 385c, or a record partition 385d. In some cases, the record partitioning system 270 generates one or more partitions based on a similarity among records. For example, responsive to determining that the data records U4, U5, and U9 are sufficiently similar (e.g., a similarity metric of the records exceeds a threshold similarity), the record partitioning system 270 generates the record partition 385a including the data records U4, U5, and U9. Additionally or alternatively, responsive to determining that the data records U1, U2, U3, U6, U7, and U8 are sufficiently similar, the record partitioning system 270 generates the record partition 385b including the data records U1, U2, U3, U6, U7, and U8. In some cases, the record partitioning system 270 determines similarity among records based on one or more hashing techniques, such as an LSH technique, a MinHash technique, or other suitable hashing techniques.

In some cases, one or more additional records partitions are generated from a particular partition. For example, responsive to determining that the record partitions 385a and 385b have sizes that are not approximately equivalent (e.g., a quantity of three records as compared to a quantity of six records), the record partitioning system 270 generates the record partitions 385c and 385d based on the partition 385b. For example, the record partition 385c could include the data records U1-U3 and the record partition 385d could include the data records U6-U8.

In some implementations, a component of an interactive trait expansion system, such as a cluster generation system, generates or modifies one or more additional data structures based on the binary record dataset 380 or the record partitions 385a-385d. For example, the cluster generation system 260 generates, based on the record partitions 385a-385d, one or more model factors or correction factors. In some cases, the model factors or correction factors can be included in one or more data description functions, such as the candidate description function 240 or the modified candidate description function 250. Additionally or alternatively, the model factors or correction factors can be generated responsive to identifying a group of data elements that each include a particular value.

For example, the cluster generation system 260 identifies, within the record partition 385a, that data elements associated with the traits T3 and T4 each have the value 1. Responsive to identifying a first group of data elements associated with the traits T3 and T4, the cluster generation system 260 generates a model factor 345. The model factor 345 includes data indicating that the first group of data elements, e.g., associated with the traits T3 and T4, have a first value, e.g., the value 1. In some cases, the model factor 345 includes data indicating that the first group of data elements are included in the records U4, U5, and U9. Additionally or alternatively, the model factor 345 includes data indicating that the first group of data elements are included in a portion of the dataset 380 (e.g., three records, 33% of records) without identifying which records are included in the portion.

Within the record partition 385c, the cluster generation system 260 identifies that the data elements associated with the traits T1 and T2 each have the value 1. Responsive to identifying a second group of data elements associated with the traits T1 and T2, e.g., elements in the records U1-U3, the cluster generation system 260 generates a model factor 355. The model factor 355 includes data indicating that the second group of data elements, e.g., associated with the traits T1 and T2, have the first value, e.g., the value 1. Additionally or alternatively, the cluster generation system 260 identifies, within the record partition 385c, that a particular data element associated with the trait T3 has the first value 1, such as a particular element in the record U3. The cluster generation system 260 generates, for example, a correction factor 348, which includes data indicating that the particular data element associated with the trait T3 has the first value 1.

Within the record partition 385d, the cluster generation system 260 identifies that the data elements associated with the traits T1 and T2 each have the first value 1. Responsive to identifying a third group of data elements associated with the traits T1 and T2, e.g., elements in the records U6-U8, the cluster generation system 260 modifies the model factor 355. In some cases, the cluster generation system 260 generates an additional model factor which is subsequently merged with the model factor 355. The modified model factor 355 includes data indicating that the second and third groups of data elements from the records U1-U3 and U6-U8, e.g., associated with the traits T1 and T2, have the first value 1. Additionally or alternatively, the cluster generation system 260 identifies, within the record partition 385d, that an additional data element associated with the trait T3 has the first value 1, such as a particular element in the record U6. The cluster generation system 260 generates, for example, an additional correction factor 349, which includes data indicating that the additional data element associated with the trait T3 has the first value 1.

In some cases, the model factor 345, the model factor 355, the correction factor 348, and the correction factor 349 are included in a candidate description function, such as the candidate description function 240. Additionally or alternatively, the cluster generation system 260 iteratively modifies the candidate description function 240. For example, one or more additional model factors can be iteratively identified based on combinations of correction factors. The cluster generation system 260 generates the modified candidate description function 250 based on iteratively identified factors, for example, to include more or fewer model factors or correction factors.

In some implementations, subsequent to identifying the model factors 345 and 355, the cluster generation system 260 combines the correction factors 348 and 349. Within the combined correction factors 348 and 349, the cluster generation system 260 identifies that a fourth group of data elements associated with the trait T3 each have the first value 1. Responsive to identifying the fourth group of data elements associated with the trait T3, the cluster generation system 260 generates a model factor 353. The model factor 353 includes data indicating that the fourth group of data elements, e.g., elements associated with the trait T3 in the records U3 and U6, have the first value 1. In some cases, the cluster generation system 260 generates the modified candidate description function 250 to include the model factor 345, the model factor 355, and the model factor 353. Additionally or alternatively, the modified candidate description function 250 omits the correction factor 348 and the correction factor 349. In some cases, replacing a group of correction factors with a model factor that represents a same set of data elements as the group of correction factors can reduce a length of a candidate description function.

In some implementations, a data record clustering system (such as one or more of the data record clustering systems 140 or 200) is configured to apply one or more rules-based operations to calculate one or more cost factors related to a data description function. For example, the cluster generation system 260 generates the candidate description function 240 and the modified candidate description function 250 by applying rules-based operations for calculating one or more cost factors associated with merging groups of data clusters corresponding to respective model or correction factors.

Equation 1, for instance, describes a non-limiting example of a calculation to determine a model length for a particular data description function.

$$L = L(M) + L(D|M) \qquad \text{Eq. 1}$$

In Equation 1, a total description length L is calculated as a combination, such as a sum, of a model description length $L(M)$ and a correction description length $L(D|M)$. The model description length $L(M)$ is, for example, a quantity of model factors included in a data description function that describes a particular group of data records (e.g., a dataset, a record partition of a dataset). The correction description length $L(D|M)$ is, for example, a quantity of correction factors in the data description function. For the modified candidate description function 250, for instance, the model description length $L(M)$ has a value of 2, i.e., the modified candidate description function 250 includes the two model factors 255 and 253. Additionally or alternatively, for the modified candidate description function 250, the correction description length $L(D|M)$ has a value of 1, i.e., the modified candidate description function 250 includes the one correction factor 257. In some cases, the model description length $L(M)$ and the correction description length $L(D|M)$ are associated with a particular record partition, such as a particular one of the record partitions 285. Additionally or alternatively, the correction description length $L(D|M)$ describes the quantity of corrections in the particular record partition's representation of data, e.g., particular data elements that are not otherwise represented by the model factors indicated by $L(M)$.

In some implementations, a data record clustering system is configured to apply one or more rules-based operations to calculate a quality metric for a set of data description functions. For instance, the example data record clustering system calculates a relationship of a quantity of record partitions (e.g., a quantity of the partitions 285) with total description lengths associated with the record partitions. In some cases, the relationship of the quantity of partitions to the total description lengths of the partitions indicates a quality metric of the partition. Equation 2, for instance, describes a non-limiting example of a calculation to determine a relationship of a quantity of record partitions with total description lengths of the record partitions.

$$L(p) = \|P\| + \|(\cup_{(p \in P)} r_p \times u_p) \oplus R\| \qquad \text{Eq. 2}$$

In Equation 2, a partition set length $L(P)$ describes a description length for a set of record partitions P. Each partition in the set of record partitions P is associated with one or more representations that are included in the set of representations R. In some cases, each partition p in the set of partitions P has a respective set of data records $u_p$ that are included in the partition p. Additionally or alternatively, each partition p in the set of partitions P has a respective representation $r_p$ that describes data elements in the data records $u_p$ having a particular value (e.g., 1). For example, the record partition 385a includes a set of data records $u_p$ that include the records U4, U5, and U9. Additionally or alternatively, the record partition 385a has a representation described by the model factor 345, indicating that data elements corresponding to the traits T3 and T4 have the first value 1.

In Equation 2, the partition set length L(P) is based on a combination of a first term ∥P∥ describing a quantity of partitions in the partition set, and a second term ∥(∪$_{(p \in P)}$ $r_p$×$u_p$)⊕R∥ describing a quantity of particular representations for each partition p. For example, for a group of representation $r_p$ describing data records $u_p$ in a particular partition p, the second term ∥(∪$_{(p \in P)}$$r_p$×$u_p$)⊕R∥ identifies a disjunctive union of the set of representations R and a union of representations $r_p$ for all partitions p belonging to the set of partitions P. In some cases, the data record clustering system 200 identifies, based on the partition set length L(P), a relationship between a quantity of unique representations in the set of representations R and a quantity of the partitions P for which the representations R are generated. Additionally or alternatively, the data record clustering system 200 identifies a quality metric of the partitions P based on a value of the partition set length L(P). For example, if the data record clustering system 200 identifies that the first term ∥P∥ is relatively large, e.g., one partition p per each data record $u_p$, the data record clustering system 200 could identify one or more partitioning (or repartitioning) techniques to reduce a quantity of partitions, such as by including multiple data records in a particular partition. Additionally or alternatively, if the data record clustering system 200 identifies that the second term ∥(∪$_{(p \in P)}$$r_p$×$u_p$)⊕R∥ is relatively large, e.g., each partition p has a high quantity of model and correction factors in the respective representations $r_p$, the data record clustering system 200 could identify one or more partitioning (or repartitioning) techniques to modify which data records are included in respective partitions, such as by creating (or modifying) one or more partitions to include additional or different data records.

Figure 4:
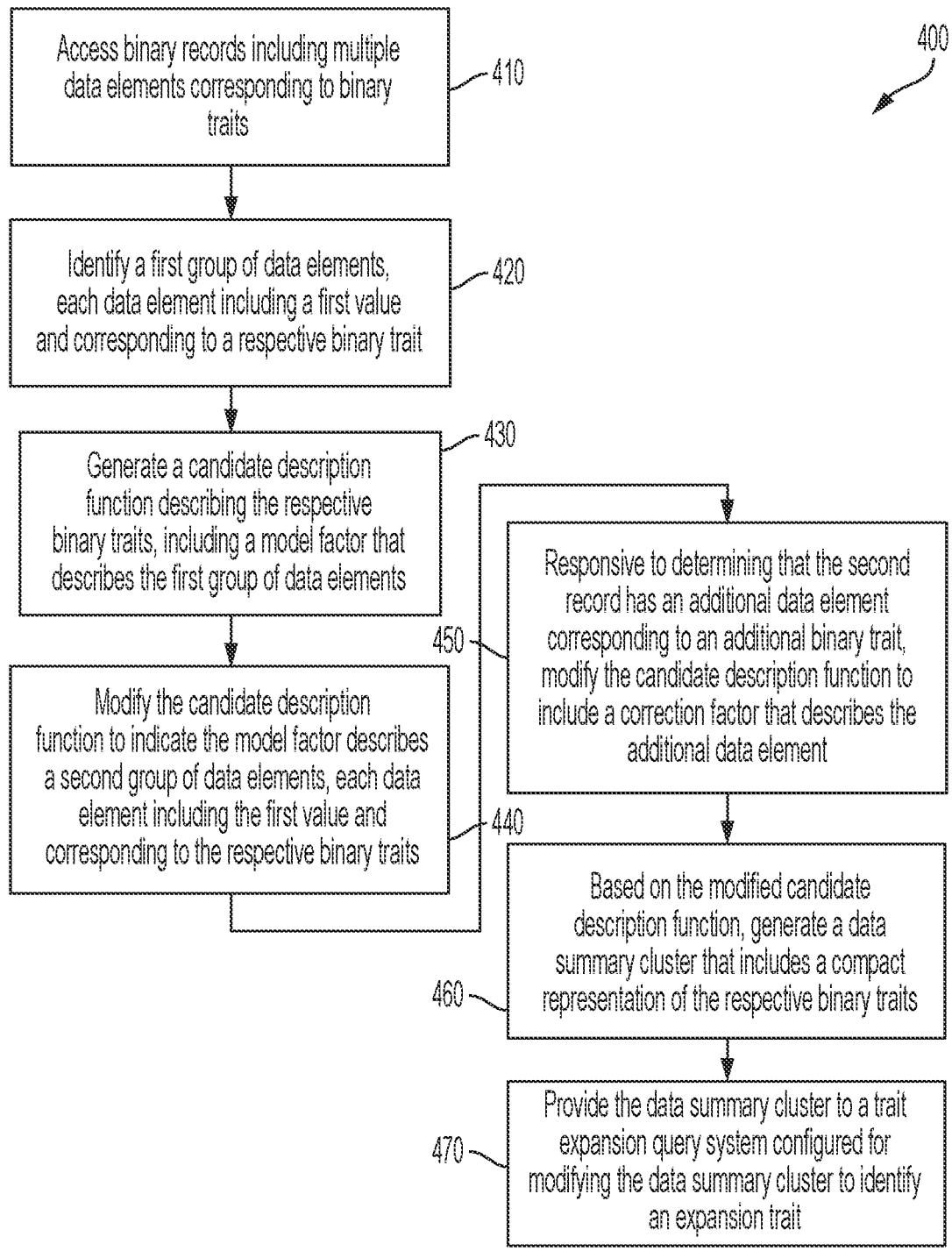
FIG. 4 is a flow chart depicting an example of a process for generating one or more data summary clusters, according to certain embodiments.

FIG. 4 is a flow chart depicting an example of a process 400 for generating one or more data summary clusters. In some embodiments, such as described in regards to FIGS. 1-3, a computing device executing a data record clustering system, such as in an interactive trait expansion system, implements operations described in FIG. 4, by executing suitable program code. For illustrative purposes, the process 400 is described with reference to the examples depicted in FIGS. 1-3. Other implementations, however, are possible.

At block 410, the process 400 involves accessing a set of one or more binary data records, such as accessing, via a data record clustering system, data records of a very large binary dataset. In some cases, each of the one or more binary data records includes a set of data elements. Additionally or alternatively, the data element correspond to binary traits, such as population traits that are represented by a value in a binary data value pair (e.g., I/O, true/false). In some cases, each of the one or more binary data records includes a set of data elements that respectively correspond to each trait in the binary dataset e.g., traits exhibited (or not exhibited) by entities represented by the binary data records. For example, the data record clustering system 200 accesses the binary record dataset 280. Additionally or alternatively, the data record clustering system 200 accesses data elements of records within the binary record dataset 280, such as the data elements 283a-283n for the respective records 280a-280n. In some cases, the binary data records are arranged as a binary matrix data structure. For example, the binary record dataset 380 includes the records U1-U9 arranged as a matrix with the traits T1-T4.

At block 420, the process 400 involves identifying a first group of data elements in one or more records of the binary data records. In some cases, the first group of data elements are included in a first record of the binary data records. Additionally or alternatively, each data element in the first group of data elements corresponds to a respective trait of the binary traits. In some cases, the data record clustering system identifies the first group based on a determination that each data element in the first group includes a first value, such as a particular value (e.g., 1) of the binary data value pair representing the traits. In some cases, the first value indicates that an entity associated with the first record exhibits the trait or traits represented by the data elements in the first group. For example, the cluster generation system 260 identifies, in the binary record 280a, a first group of the data elements 283a that have the value 1. In some cases, the first group of data elements are identified in a data record (or records) that is included in a record partition, such as a particular partition of the record partitions 285. Additionally or alternatively, the cluster generation system 260 identifies, in the binary record dataset 380, a group of data elements in the records U1, U2, and U3 having the value 1, such as data elements associated with the traits T1 and T2.

At block 430, the process 400 involves generating a candidate description function that describes the respective binary traits of the first group of data elements. In some cases, the candidate description function includes one or more model factors or correction factors. For example, the data record clustering system generates a first model factor in the candidate description function, the first model factor describing the first group of data elements. In some cases, the first model factor includes a compact representation of the first group of data elements. For example, the cluster generation system 260 generates, in the candidate description function 240, the model factor 245 that represents the first group of the data elements 283a. Additionally or alternatively, the cluster generation system 260 generates the model factor 355 that describes the data elements associated with the traits T1 and T2 from the records U1, U2, and U3.

At block 440, the process 400 involves modifying the candidate description function, such as a modification based on a second group of data elements that have the first value (e.g., 1). In some cases, the second group of data elements is included in a second record from the binary data records. Additionally or alternatively, the second group of data elements correspond to the respective traits, e.g., the respective traits corresponding to the first group of data elements. In some cases, responsive to determining that the second group of data elements correspond to the respective traits, the data record clustering system modifies the candidate description function. The modified candidate description function indicates, for example, that the first model factor describes the second group of data elements or a combination of the first and second groups of data elements. For example, the cluster generation system 260 modifies the model factor 355 to describes the data elements associated with the traits T1 and T2 from the records U1-U3 and U6-U8. In some implementations, the data record clustering system generates the modified candidate description function based on the candidate description function described in regard to block 430. For example, the cluster generation system 260 generates the modified candidate description function 250, in which the model factor 255 represents the second group of the data elements 283b.

At block 450, the process 400 involves modifying the candidate description function, such as an additional modification, to include one or more correction factors. The additional modification is based on, for example, identifying an additional data element that has the first value (e.g., 1). The additional data element is included in the binary data records, such as in the second record. Additionally or alternatively, the additional data element corresponds to an additional binary trait that is excluded from the respective traits corresponding to the first and second groups of data elements. In some cases, responsive to determining that the additional data element corresponds to the additional binary trait, the data record clustering system modifies the candidate description function to include a correction factor. The correction factor describes the additional data element, such as via a compact representation. For example, the cluster generation system 260 generates the model factor 348 to describes a particular data element associated with the trait T3 from the record U3. Additionally or alternatively, the cluster generation system 260 generates, in one or more of the description functions 240 or 250, the correction factor 247 that represents a respective one of the data elements 283*a* having the first value 1.

At block 460, the process 400 involves generating one or more data summary clusters based on the modified candidate description function (or the candidate description function). In some cases, each data summary cluster corresponds to a particular model factor or correction factor included in the modified candidate description function. Additionally or alternatively, each data summary cluster includes a compact representation of the binary traits represented by the particular model factor or correction factor. In some cases, the data record clustering system generates a first data summary cluster that includes a compact representation of the respective binary traits corresponding to the first and second groups of data elements. Additionally or alternatively, the data record clustering system generates a second data summary cluster that includes a compact representation of the additional binary trait corresponding to the additional data element. For example, the cluster generation system 260 generates one or more of the data summary clusters 265 based on respective ones of the model factor 255, model factor 253, or the correction factor 257.

At block 470, the process 400 involves providing one or more of the data summary clusters to at least one additional component in an interactive trait expansion system. For example, the data record clustering system provides the first data summary cluster (at least) to a trait expansion query system. In some cases, the trait expansion query system is configured to modify the one or more data summary clusters, such as to identify an expansion trait associated with a subset of the binary data records. For example, the data record clustering system 200 provides one or more of the data summary clusters 265 to the trait expansion query system 130. Additionally or alternatively, the trait expansion query system 130 modifies the data summary clusters 265, or local copies of the clusters 265. For example, based on the modified clusters, the trait expansion query system 130 identifies one or more expansion traits associated with a subset of at least one of the binary records 280. In some cases, the trait expansion query system 130 calculates a trait similarity score for each record in the subset of the records 280, based on the identified expansion trait or traits.

In some cases, one or more operations related to one or more blocks of the process 400 are repeated. For example, the data record clustering system could generate multiple model factors or correction factors based on multiple identified groups of data elements, such as generally described in regard to blocks 420, 430, 440, or 450. Additionally or alternatively, the data record clustering system could perform multiple modifications of a candidate description function to include multiple model factors or correction factors (or modifications to factors), such as generally described in regard to blocks 440 or 450.

In some cases, one or more operations related to one or more blocks of the process 400 are repeated as part of an iterative process. For example, the data record clustering system could iteratively generate an aggregation of data elements represented by multiple correction factors. Based on the aggregation of data elements, the data record clustering system could identify, within the aggregation, one or more additional groups of data elements corresponding to a particular binary trait (or traits), such as generally described in regard to block 420. The data record clustering system could generate (or modify) one or more additional model factors respectively describing the additional groups of data elements from the aggregation, such as generally described in regard to blocks 430 or 440. In some cases, the data record clustering system modifies the candidate description function or modified candidate description function to include the additional model factors, such as generally described in regard to blocks 430, 440, or 450. In some cases, an iterative process of aggregating data elements represented by correction factors is repeated until the data record clustering system identifies negative cost reductions associated with the aggregated data elements, e.g., an additional attempt to merge data elements results in an increased quantity of combined model factors and correction factors.

In some implementations, a data record clustering system (such as one or more of the data record clustering systems 140 or 200) is configured to apply one or more rules-based operations to generate one or more record partitions based on data records in a dataset. For example, the record partitioning system 270 generates the record partitions 285 based on the binary record dataset 280. In some cases, the record partitioning system 270 generates a particular record partition responsive to identifying a relationship of one or more traits with one or more data records. In some cases, the particular record partition is associated with a representation that estimates traits exhibited by records in the particular record partition. Equation 3, for instance, describes a non-limiting example of a calculation to determine an estimated representation of data records that are included in a particular record partition. Additionally or alternatively, the record partitioning system 270 calculates a compactness metric for the particular record partition, indicating a similarity of values within data elements of the particular record partition. Equation 4, for instance, describes a non-limiting example of a compactness metric for a particular record partition.

$$r_{p_i} = \left\{ t : t \in t_{p_i} \text{ and } \frac{|u_{p_i} \cap R_t|}{|u_{p_i}|} \geq 0.5 \right\} \quad \text{Eq. 3}$$

$$(\text{Compactness}(p, t_i) = 1 - H_b\left(\frac{\mathbb{1}_p(t_i)}{|u_p|}\right) \quad \text{Eq. 4}$$

In Equation 3, a particular partition $p_i$ is the ith partition in a set of record partitions P. Additionally or alternatively, the partition $p_i$ includes data elements that have a particular data value, e.g., a value 1. In some cases, the data elements with the particular value indicate relations between a record (e.g., a row) that includes a particular data element and a trait (e.g., a column) that includes the particular data element. Additionally or alternatively, the partition $p_i$ includes a set of data records $u_{pi}$ and a set of traits $t_{pi}$ that are related via data elements having the particular value. In some cases, the set $R_t$ includes data records $u_{pi}$ that include a particular trait t.

In Equation 3, a representation $r_{pi}$ is associated with the partition $p_i$. The representation $r_{pi}$ includes the trait t if the trait t is included in the set of traits $t_{pi}$ for the partition $p_i$, and if a ratio of data records $u_{pi}$ belonging to the set $R_t$ to a quantity of the data records $u_{pi}$ is greater than 0.5. In some cases, the representation $r_{pi}$ includes the trait t if more than half (e.g., a ratio of 0.5) of the data records in the partition $p_i$ include the trait t. The Equation 3 provides an example ratio of 0.5, but other ratios are possible.

In Equation 4, a compactness metric Compactness(p, $t_i$) is calculated for the ith trait $t_i$ that is included in a partition p (such as the partition $p_i$ described in regard to Equation 3). In Equation 4, the term $\mathbb{I}_p(t_i)$ indicates a quantity of data records (e.g., rows) that contain the trait $t_i$ in the partition p. A binary entropy function $H_b$ is calculated for a ratio of the term $\mathbb{I}_p(t_i)$ and a quantity of data records $u_p$ included in the partition p. In Equation 4, the Compactness(p, $t_i$) is calculated as a difference of the binary entropy function $H_b$ and a constant value 1.

In some cases, the compactness metric calculated via Equation 4 indicates a similarity, across multiple data records $u_p$, of values for the trait $t_i$. For example, if a large quantity of the data records $u_p$ have a same value (e.g., a same value 1, a same value 0) in a data element for the trait the ratio of the data records containing the trait $t_i$ in (e.g., the term $\mathbb{I}_p(t_i)$) to data records $u_p$ will tend towards 1. Additionally or alternatively, if about half of the data records $u_p$ have a first value (e.g., 1) and about half of the data records $u_p$ have a second value (e.g., 0), the ratio will tend towards 0. In some cases, the record partitioning system 270 (or another component in a data record clustering system) determines a quality for a partition based on a compactness metric of the partition. Additionally or alternatively, the record partitioning system 270 partitions or repartitions a group of data records, responsive to determining that a compactness metric is relatively low. For example, the record partitioning system 270 could determine that a particular partition with non-homogenous data elements (e.g., indicated via a relatively low compactness metric) would require a relatively large quantity of model factors and/or correction factors for representation.

Figure 5:
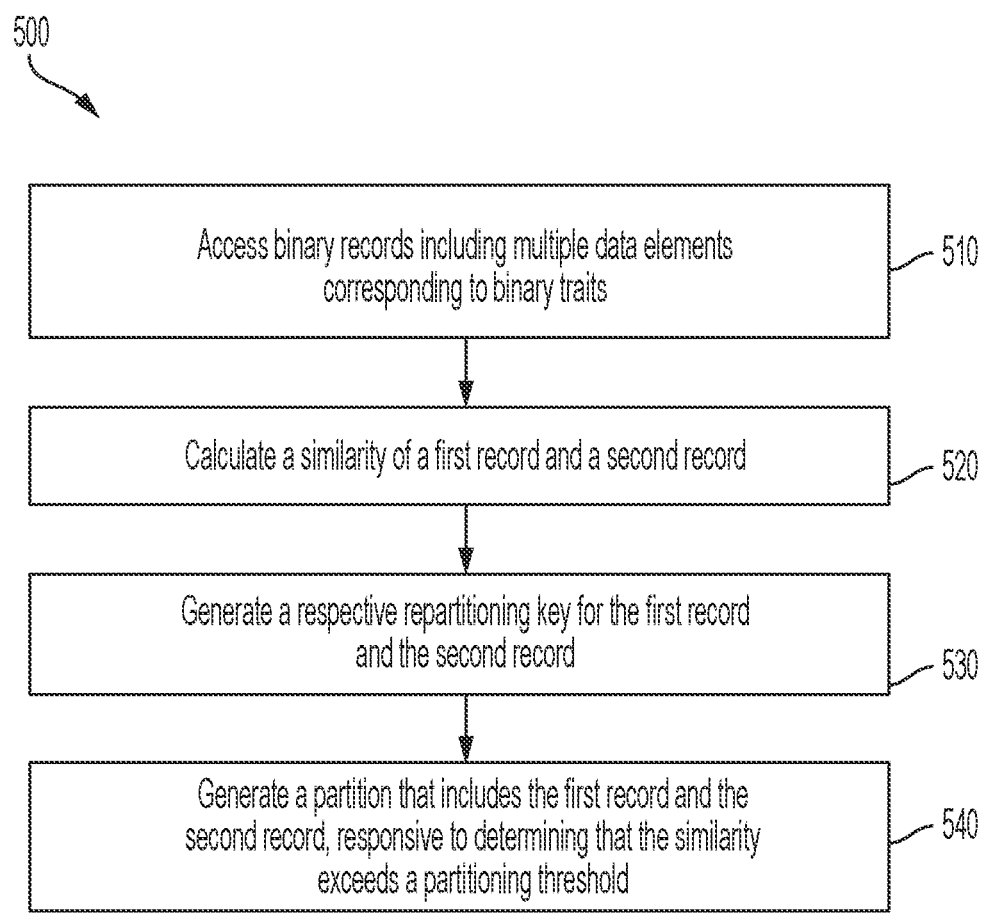
FIG. 5 is a flow chart depicting an example of a process for generating one or more record partitions of a very large binary dataset, according to certain embodiments.

FIG. 5 is a flow chart depicting an example of a process 500 for generating one or more record partitions, such as from a very large binary dataset. In some implementations, one or more operations related to FIG. 4, at least, are performed based on one or more data records that are included in a record partition, such as a record partition that is generated based on one or more operations related to FIG. 5. In some embodiments, such as described in regards to FIGS. 1-4, a computing device executing a data record clustering system, such as in an interactive trait expansion system, implements operations described in FIG. 5, by executing suitable program code. For illustrative purposes, the process 500 is described with reference to the examples depicted in FIGS. 1-4. Other implementations, however, are possible.

At block 510, the process 500 involves accessing a set of one or more binary data records, such as data records of a very large binary dataset. In some cases, each of the one or more binary data records includes multiple data elements that correspond to binary traits. For example, the data record clustering system 200 accesses the binary record dataset 280, including the data elements 283a-283n for the respective records 280a-280n. In some cases, the binary data records are arranged as a binary matrix data structure. For example, the binary record dataset 380 includes the records U1-U9 arranged as a matrix with the traits T1-T4.

At block 520, the process 500 involves calculating a similarity of a first record and a second record that are included in the binary data records. The similarity is calculated, for example, by a record partitioning system that is included in a data record clustering system. For example, the similarity calculation module 275, in the record partitioning system 270, calculates a similarity among a group of two or more records from the binary record dataset 380, such as a similarity of data elements in the records U1-U9. In some cases, the similarity is calculated as a Jaccard similarity, but other similarity calculation techniques suitable for a binary matrix may be used. For example, the similarity calculation module 275 could calculate a Jaccard similarity among data elements, among multiple records, that correspond to particular ones of the traits T1-T4.

At block 530, the process 500 involves generating, for each of the first record and the second record, a respective repartitioning key. For example, the repartitioning module 277 in the record partitioning system 270 generates a respective repartitioning key for each record in the partition 385b, such as a key that includes a random (or pseudo-random) integer generated via a "salted hash" function.

At block 540, the process 500 involve generating or modifying a partition that includes the first record and the second record. The record partitioning system generates the partition responsive to, for example, determining that the similarity of the first record and the second record exceeds (or fulfills another relationship with) a partitioning threshold. Additionally or alternatively, the record partitioning system generates the partition based on one or more respective repartitioning keys of the first record and the second record. In some cases, the record partitioning system generates the repartitioning keys responsive to determining that at least one record partition, e.g., generated based on calculated similarities of the first and second records, has a size that is dissimilar to one or more additional partitions.

For example, the similarity calculation module 275 compares the calculated similarity (e.g., among the records U1-U9) to the partitioning threshold 273. The record partitioning system 270 generates one or more record partitions based on the calculated similarity (or similarities). Regarding the binary record dataset 380, for example, responsive to determining that the similarity of the records U4 and U5 exceeds (or fulfills another relationship with) the partitioning threshold 273, the record partitioning system 270 generates or modifies the record partition 385a to include the records U4 and U5. Additionally or alternatively, responsive to determining that the similarity of the records U3 and U4 is below the partitioning threshold 273, the record partitioning system 270 generates or modifies multiple record partitions, such as including the record U4 in the partition 385a and the record U3 in the partition 385b.

Additionally or alternatively, the record partitioning system 270 generates the record partitions 385c and 385d based on respective repartitioning keys for each record in the partition 385b. For example, responsive to determining that the record partition 385b has a size that is relatively large compared to a size of the partition 385a, the repartitioning module 277 generates a respective repartitioning key for each of the records U1, U2, U3, U6, U7, and U8 in the partition 385b. In some cases, the repartitioning module 277 generates the record partitions 385c and 385d by including records having a first value for the respective repartitioning keys in the partition 385c and records having a second value for the respective repartitioning keys in in the partition 385d.

In some implementations, data related to repartitioned data records is merged. For example, subsequent to identifying model factors or correction factors for each of the record partitions 385c and 385d, the cluster generation system 260 merges some or all of the factors corresponding to the partitions 385c and 385d, such as by identifying groups of data elements from each partition that correspond to a particular trait or traits. Additionally or alternatively, the cluster generation system 260 merges one or more data description functions corresponding to partitions 385c and 385d, such as by modifying model factors (or correction factors) to include the identified groups of data elements.

Figure 6:
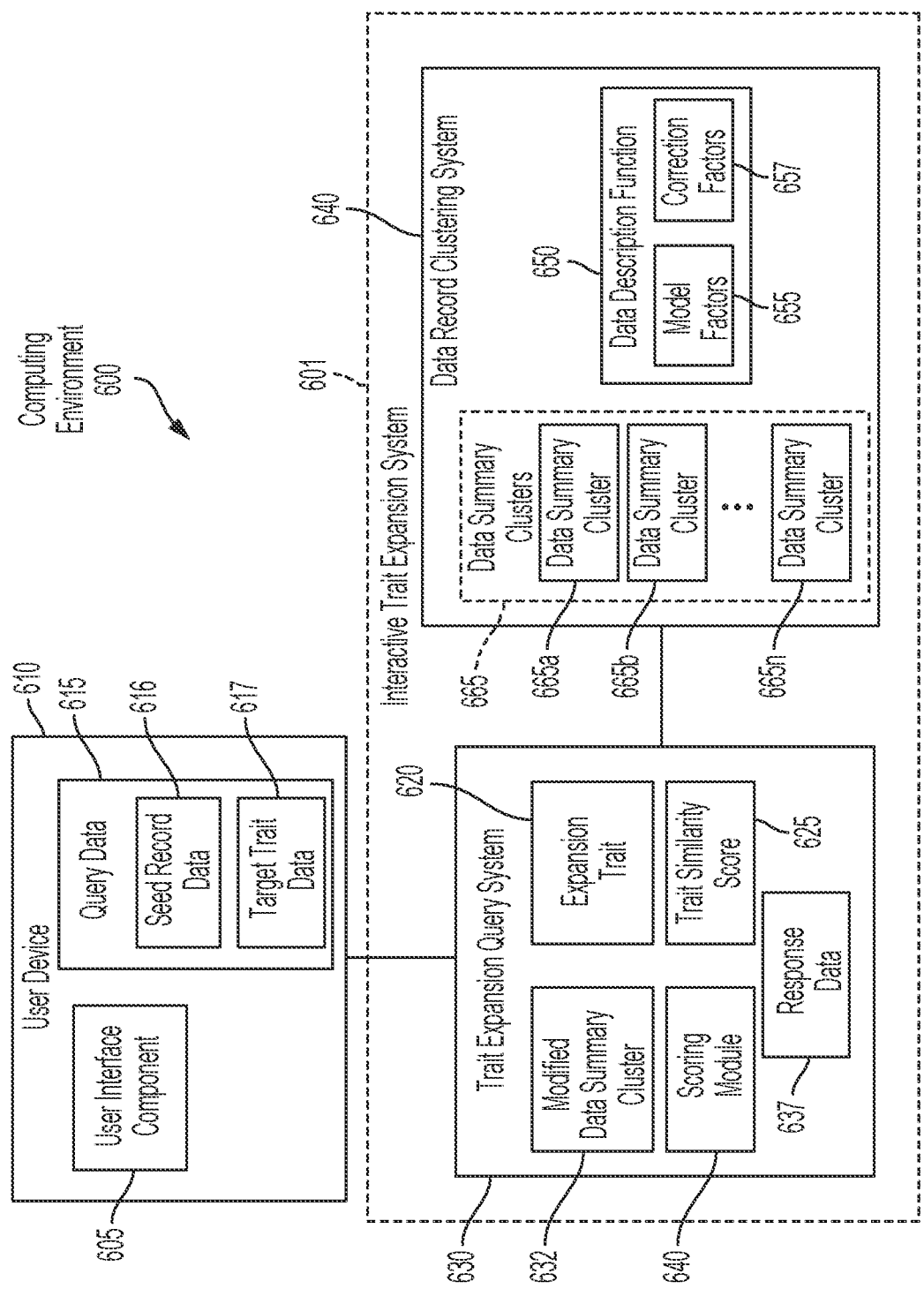
FIG. 6 is a diagram depicting an example of a trait expansion query system, in an interactive trait expansion system, that is configured to identify one or more expansion traits associated with query data, according to certain embodiments.

FIG. 6 depicts an example of a computing environment 600 in which an interactive trait expansion system 601 identifies one or more expansion traits associated with query data. The interactive trait expansion system 601 includes a trait expansion query system 630 and a data record clustering system 640. Additionally or alternatively, the computing environment 600 includes one or more data storage components, such as the datastore 190 described in regard to FIG. 1, that are configured to communicate with one or more of the trait expansion query system 630 or the data record clustering system 640. In some cases, the data record clustering system 640 and the trait expansion query system 630 are implemented as components within a particular computing system, such as software modules that operate on one or more memory components of a computing system. Additionally or alternatively, one or more of the data record clustering system 640 or the trait expansion query system 630 are implemented as particular computing systems, such as separate computing systems that are configured to communicate via a computing network.

In FIG. 6, the data record clustering system 640 is configured to generate a data description function 650. The data description function 650 includes one or more model factors, such as model factors 655. In some cases, the data description function 650 includes at least one correction factors, such as correction factors 657. Additionally or alternatively, the data record clustering system 640 is configured to generate one or more data summary clusters, such as a data summary cluster 665a, a data summary cluster 665b, and additional data summary clusters including a data summary cluster 665n (collectively referred to herein as data summary clusters 665). Each of the data summary clusters 665 corresponds to a particular model factor of the model factors 655. Additionally or alternatively, each cluster in the data summary clusters 665 includes a compact representation of a respective group of data elements represented by the corresponding model factor. In some cases, the data record clustering system 640 generates one or more of the data description function 650 or the data summary clusters 665 based on a very large binary dataset, such as the dataset 180. Additionally or alternatively, the data record clustering system 640 generates one or more of the data description function 650 or the data summary clusters 665 utilizing techniques described in regard to, at least, FIGS. 2-3.

In some cases, the computing environment 600 includes one or more user devices, such as a user device 610. In FIG. 6, the user device 610 is configured to communicate with the trait expansion query system 630. The user device 610 includes at least one user interface component, such as a user interface component 605. In some cases, the user interface component 605 includes at least one display device (e.g., monitor, touchscreen, projector) and at least one input device (e.g., keyboard, mouse, microphone, touchscreen). The user interface component 605 can be configured to display a user interface via which a user, such as a researcher or a data technician, can provide data to and receive data from the user device 610. For example, the user interface component 605 could display a visual interface (e.g., a web portal, an application) configured to receive input or provide output related to queries for the interactive trait expansion system 601. For instance, the user interface component 605 receives input data describing one or more queries for the interactive trait expansion system 601, such as queries describing various combinations of seed population records and target population traits. Additionally or alternatively, the user interface component 605 could display output data describing responses to the one or more queries, such as respective responses describing similarities of multiple population records with the seed population records and target population traits. In some cases, a response to a query could be displayed as a chart or other graphical representation, such as a chart indicating groups of population records that are above or below a particular similarity threshold with respect to the seed population records.

In some implementations, a query for the interactive trait expansion system 601 is described by query data, such as query data 615, that is received via the user interface component 605. The query data 615 can include seed record data 616, such as data identifying one or more seed population records selected from a dataset of binary records (such as the dataset 180 described in regard to FIG. 1). Additionally or alternatively, the query data 615 can include target trait data 617, such as data identifying one or more target population traits associated with the dataset of binary records (such as the dataset 180).

In FIG. 6, the trait expansion query system 630 receives the query data 615 from the user device 610. Additionally or alternatively, the trait expansion query system 630 accesses one or more of the data summary clusters 665. In some cases, the trait expansion query system 630 generates local copies of the data summary clusters 665. Additionally or alternatively, the trait expansion query system 630 modifies the data summary clusters 665 based on the query data 615, such as by creating (or modifying) a modified data summary cluster 632. In some cases, the trait expansion query system 630 identifies at least one expansion trait, such as an expansion trait 620, based on the modified data summary cluster 632. Additionally or alternatively, the trait expansion query system 630 calculates at least one similarity score, such as a trait similarity score 625, that indicates a similarity of the expansion trait 620 with one or more additional traits associated with one or more additional records represented by the data summary clusters 665.

In some cases, the modified data summary cluster 632 is generated from a subset of the data summary clusters 665. For example, the trait expansion query system 630 identifies, from the data summary clusters 665, at least one cluster that includes a compact representation of the target population traits identified by the target trait data 615. The data summary cluster 665a and the data summary cluster 665b are identified, for example, as representing the target population traits from the data 615. Additionally or alternatively, the trait expansion query system 630 identifies at least one cluster that does not represent the target population traits, such as the data summary cluster 665n. The trait expansion query system 630 omit the at least one non-representative cluster from the modified data summary cluster 632. In some cases, omitting a non-representative cluster from a modified data summary cluster can improve an interactive trait expansion system's responsiveness to queries, such as by reducing an amount of time to analyze the modified data summary cluster.

Additionally or alternatively, the trait expansion query system 630 determines overlap among data elements of at least two clusters included in the modified data summary cluster 632. In examples described herein, "overlap" among data elements describes a degree to which a first group of data elements represents identical (or approximately identical) records as a second group of data elements. For example, the trait expansion query system 630 determines that data elements represented by the cluster 665a overlap with data elements represented by the cluster 665b, e.g., that data elements of the cluster 665a and the data elements of the cluster 665b are associated with a same, or substantially the same, group of binary records. In some cases, the trait expansion query system 630 determines that the data summary clusters 665a and 665b satisfy an overlap threshold, such as by determining that the data elements of the clusters 665a and 665b are associated with a threshold amount (e.g., a quantity, a percentage) of same binary records. Responsive to determining that the at least two data summary clusters represent overlapping sets of data elements, the trait expansion query system 630 modifies at least one of the clusters to include at least one data element of an additional one of the clusters. For example, the trait expansion query system 630 modifies the data summary cluster 665a to include data elements of the data summary cluster 665b. In some cases, a local copy of the cluster is modified, such as an additional modification to the modified data summary cluster 632 to include a union (or other combination) of columns from the data summary clusters 665a and 665b.

Additionally or alternatively, the trait expansion query system 630 identifies similar clusters included in the modified data summary cluster 632. For example, based on determining an overlap between the data summary clusters 665a and 665b, as described above, the modified data summary cluster 632 could include a copy of the cluster 665a that includes data elements from the cluster 665b, and also a copy of the cluster 665b that includes data elements from the cluster 665a. In some cases, the trait expansion query system 630 calculates a Jaccard similarity (or another suitable similarity metric) of data elements represented in the modified data summary cluster 632. Additionally or alternatively, the trait expansion query system 630 modifies the modified data summary cluster 632 to re-cluster duplicate (e.g., identical or substantially identical) representations of data elements. For example, the modified data summary cluster 632 is modified to include a particular copy of the combined clusters 665a and 665b, and to re-cluster with the particular copy any additional copies of the 665a/665b combination. In some cases, the trait expansion query system 630 utilizes hierarchical clustering with single linkage (or another suitable clustering technique) to re-cluster duplicate representations of data elements within the modified data summary cluster 632.

In some implementations, the trait expansion query system 630 identifies the expansion trait 620 from traits represent by the modified data summary cluster 632. For example, subsequent to generating the modified data summary cluster 632 based on identifying a subset of the data summary clusters 665, determining an overlap among data elements, and generating a combination (e.g., union of data elements, re-clustering of duplicate clusters) of represented data elements, the trait expansion query system 630 identifies at least one trait, e.g., the expansion trait 620, that is represented by the data elements.

Additionally or alternatively, the trait expansion query system 630 calculates the trait similarity score 625 based on the expansion trait 620. For example, a score calculation module 640 that is included in the trait expansion query system 630 calculates the trait similarity score 625 for a particular record, such as a record associated with the data summary clusters 665. In some cases, the score calculation module 640 calculates a respective trait similarity score for each record included in the very large binary dataset from which the data summary clusters 665 and the data description function 650 are generated. Additionally or alternatively, the score calculation module 640 calculates a respective trait similarity score for each record in a subset of records that are associated with the data summary clusters 665. Each respective trait similarity score, such as the trait similarity score 625, indicates a similarity of the expansion trait 620 with a group of additional traits that are associated with the respective record, e.g., traits that are exhibited by the entity described by the respective record.

In some implementations, the trait expansion query system 630 provides to the user device 610 response data 637. The response data 637 describes one or more of the expansion trait 620, the trait similarity score 625, or additional trait similarity scores for additional records. In some cases, the user device 610 updates a display device, such as the user interface component 605, to provide the response data 637. For example, the user interface component 605 could display the data describing the trait similarity scores in response to the query data 615, e.g., a response indicating additional binary records that are similar to the seed records indicated by the data 616 based on the target traits indicated by the data 617. In some cases, the user interface component 605 generates a chart or other graphical representation based on the response data 637, such as a chart indicating groups of population records that are above or below a particular similarity threshold with respect to the seed population records indicated by the data 616.

In some implementations, a trait expansion query system (such as one or more of the trait expansion query systems 130 or 630) is configured to apply one or more rules-based operations to calculate a trait similarity score. For example, one or more of the trait expansion query system 630 or the scoring module 640 generates the trait similarity score 625 by applying rules-based operations for calculating similarity of a binary record with a seed population record.

Equation 5, for instance, describes a non-limiting example of a calculation to determine one or more similarity scores for a particular binary record.

$$a_{ij} = \text{Jaccard}(u_i, b_{rj}) \qquad \text{Eq. 5}$$

In Equation 5, a score $a_{ij}$ is calculated for an ith binary record $u_i$, based on a set of expansion traits $b_{rj}$. The binary record $u_i$ is, for example, the ith binary record belonging to a very large dataset of binary records, such as the dataset 180. In Equation 5, the set of expansion traits $b_{rj}$ includes representative traits $r_j$ that are exhibited by a jth seed population record. For example, the set of expansion traits $b_{rj}$ could include the expansion trait 620, determined based on the modified data summary cluster 632. In Equation 5, the score $a_{ij}$ is calculated as a Jaccard similarity between the set of expansion traits $b_{rj}$ and traits exhibited by the record $u_i$.

Figure 7:
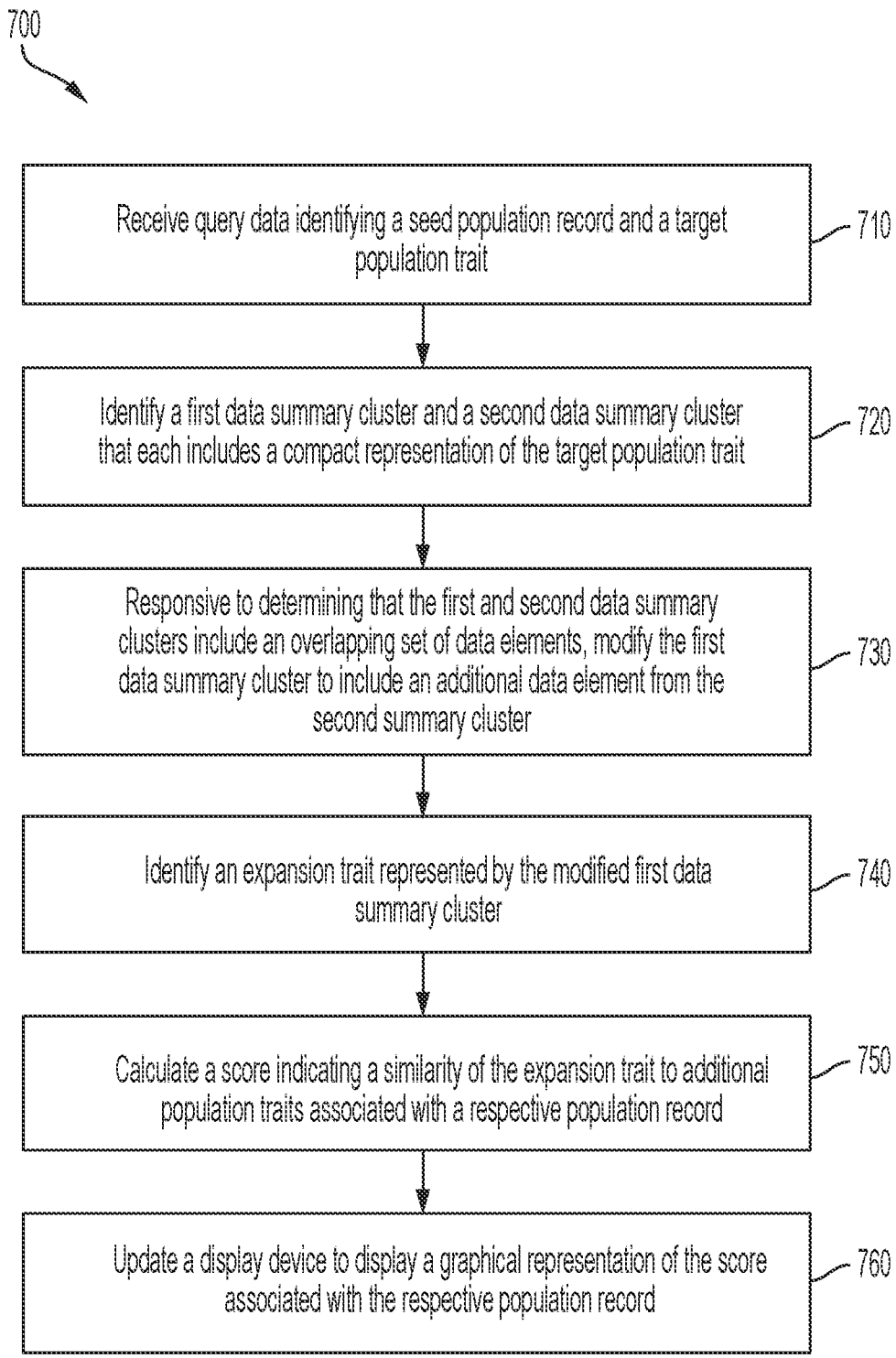
FIG. 7 is a flow chart depicting an example of a process for identifying calculating a trait similarity score for an identified expansion trait, according to certain embodiments.

FIG. 7 is a flow chart depicting an example of a process 700 for identifying calculating a trait similarity score for an identified expansion trait. In some embodiments, such as described in regards to FIGS. 1-6, a computing device executing a trait expansion query system, such as in an interactive trait expansion system, implements operations described in FIG. 7, by executing suitable program code. For illustrative purposes, the process 700 is described with reference to the examples depicted in FIGS. 1-6. Other implementations, however, are possible.

At block 710, the process 700 involves receiving query data, such as query data received by a trait expansion query system. The query data identifies at least one seed population record. Additionally or alternatively, the query data identifies at least one target population trait. In some cases, the seed population record is identified from a group of population records, such as a binary seed population record identified from a very large binary record dataset. Additionally or alternatively, the target population trait is a trait (or traits) represented by a respective data element (or elements) included in the group of population records. For example, the trait expansion query system 630 receives the query data 615 from the user device 610. In some cases, the query data 615 includes the seed record data 616 and the target trait data 617.

At block 720, the process 700 involves identifying, at least, a first data summary cluster and a second data summary cluster. The trait expansion query system, for example, identifies the first and second data summary clusters based on the seed population record and the target population trait. In some cases, each of the identified data summary clusters includes a compact representation of the target population trait. For example, based on the target trait data 616, the trait expansion query system 630 identifies the data summary cluster 665a and the data summary cluster 665b, such as by determining that the clusters 665a and 665b each include a compact representation of at least one trait indicated by the target trait data 617.

At block 730, the process 700 involves modifying one or more of the identified data summary clusters. In some cases, modifying an identified data summary cluster is response to determining that multiple ones of the identified data summary clusters include overlapping sets of data elements. The trait expansion query system, for example, modifies the first data summary cluster to include an additional data element from the second data summary cluster, responsive to determining that the first and second data summary clusters represent sets of data elements that overlap. In some cases, responsive to determining the overlap of the first and second data summary clusters, the trait expansion query system also modifies the second data summary cluster to include an additional data element from the first data summary cluster. For example, the trait expansion query system 630 generates (or modifies) the modified data summary cluster 632 based on a combination of the data summary clusters 665a and 665b. In some cases, responsive to determining that the clusters 665a and 665b represent overlapping data elements, the modified data summary cluster 632 is modified to include the data summary cluster 665a with an additional data element from the data summary cluster and 665b.

In some implementations, operations related to one or more of blocks 720 or 730 are repeated. For example, the trait expansion query system could identify multiple groups of data summary clusters that include respective compact representations of multiple target population traits. Additionally or alternatively, the trait expansion query system could modify multiple data summary clusters, or perform multiple modifications to a particular data summary cluster, responsive to determining that multiple groups of data summary clusters include respective overlapping sets of data elements.

At block 740, the process 700 involves identifying one or more expansion traits, such as expansion traits that are represented by one or more modified data summary clusters. In some cases, the trait expansion query system identifies at least one expansion trait that is represented by the modified first data summary cluster. For example, the trait expansion query system 630 determines that the expansion trait 620 is represented by the modified data summary cluster 632.

At block 750, the process 700 involves calculating one or more scores for additional population records included in the group of population records. Additionally or alternatively, the score is a trait similarity score that indicates a similarity of the expansion trait to a group of additional population traits associated with the addition record. In some cases, the trait expansion query system calculates a trait similarity score for each respective population record included in the group of population records. For example, the trait expansion query system 630 calculates a respective trait similarity score, such as the trait similarity score 625, for each respective record represented by the data summary clusters 665. In some cases, the trait expansion query system 630 calculates a respective trait similarity score for each respective record in a subset of the records represented by the data summary clusters 665.

At block 760, the process 700 involves updating at least one display device to display a graphical representation of the one or more scores. For example, the trait expansion query system provides response data describing the scores to a user device from which the query data was received. In some cases, the graphical representation includes a chart indicating groups of population records that are above or below a similarity threshold with respect to the seed population records indicated by the query data. For example, in response to the query data 615, the trait expansion query system 630 provides to the user device 610 the response data 637, which describes, at least, the trait similarity score 625.

Figure 8:
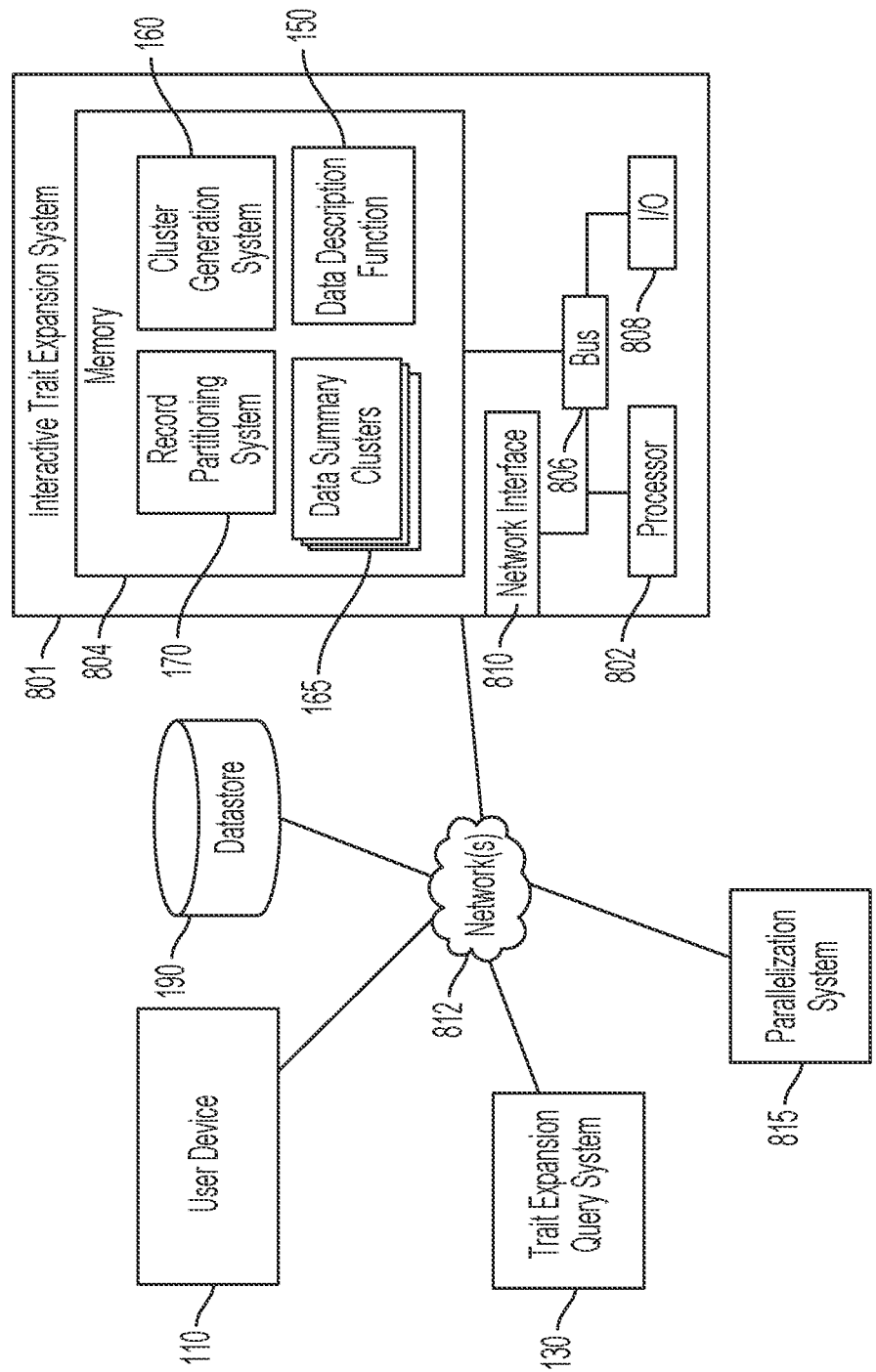
FIG. 8 is a block diagram depicting an example of a computing system capable of implementing an interactive trait expansion system, according to certain embodiments.

Any suitable computing system or group of computing systems can be used for performing the operations described herein. For example, FIG. 8 is a block diagram depicting a computing system capable of implementing an interactive trait expansion system, according to certain embodiments.

The depicted example of a computing system 801 includes one or more processors 802 communicatively coupled to one or more memory devices 804. The processor 802 executes computer-executable program code or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 includes any suitable non-transitory computer-readable medium for storing the record partitioning system 170, the cluster generation system 160, the data summary clusters 165, the data description function 150, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 801 may also include a number of external or internal devices such as input or output devices. For example, the computing system 801 is shown with an input/output ("I/O") interface 808 that can receive input from input devices or provide output to output devices. A bus 806 can also be included in the computing system 801. The bus 806 can communicatively couple one or more components of the computing system 801.

The computing system 801 executes program code that configures the processor 802 to perform one or more of the operations described above with respect to FIGS. 1-7. The program code includes operations related to, for example, one or more of the record partitioning system 170, the cluster generation system 160, the data summary clusters 165, the data description function 150, or other suitable applications or memory structures that perform one or more operations described herein. The program code may be resident in the memory device 804 or any suitable computer-readable medium and may be executed by the processor 802 or any other suitable processor. In some embodiments, the program code described above, the record partitioning system 170, the cluster generation system 160, the data summary clusters 165, and the data description function 150 are stored in the memory device 804, as depicted in FIG. 8. In additional or alternative embodiments, one or more of the record partitioning system 170, the cluster generation system 160, the data summary clusters 165, the data description function 150, and the program code described above are stored in one or more memory devices accessible via a data network, such as a memory device accessible via a cloud service.

The computing system 801 depicted in FIG. 8 also includes at least one network interface 810. The network interface 810 includes any device or group of devices suitable for establishing a wired or wireless data connection to one or more data networks 812. Non-limiting examples of the network interface 810 include an Ethernet network adapter, a modem, and/or the like. The computing system 801 is connected, via the network 812, to one or more of the datastore 190, the user device 110, the trait expansion query system 130, or one or more parallelization system 815. In some implementations, the parallelization system 815 can perform some of the operations described herein, such as parallelization techniques to perform operations related to merging, cost factor analysis, data summary cluster generation, or other techniques described herein. The computing system 801 is able to communicate with one or more of the datastore 190, the user device 110, the trait expansion query system 130, or the parallelization system 815 using the network interface 810. Although FIG. 8 depicts the trait expansion query system 130 as being connected to computing system 801 via the networks 812, other embodiments are possible, including the trait expansion query system 130 running as a program in the memory 804 of computing system 801.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method performed by one or more computing devices, the method comprising:
    accessing a set of binary records, wherein each record in the set of binary records includes multiple data elements corresponding to binary traits;
    identifying, in a first record from the set of binary records, a first group of data elements that each include a first value, wherein each data element in the first group of data elements corresponds to a respective binary trait;
    generating a candidate description function that describes the respective binary traits, wherein the candidate description function includes a model factor that describes the first group of data elements of the first record;

responsive to determining that a second record has a second group of data elements corresponding to the respective binary traits, wherein each data element in the second group of data elements includes the first value, modifying the candidate description function to indicate that the model factor further describes the second group of data elements of the second record;

responsive to determining that the second record has an additional data element corresponding to an additional binary trait that is excluded from the respective binary traits, wherein the additional data element includes the first value, modifying the candidate description function to include a correction factor that describes the additional data element of the second record;

generating a data summary cluster based on the modified candidate description function, wherein the data summary cluster includes a compact representation of the respective binary traits corresponding to the first group of data elements and the second group of data elements; and providing the data summary cluster to a trait expansion query system that is configured for modifying the data summary cluster to identify an expansion trait associated with a subset of the set of binary records.

2. The method of claim 1, wherein modifying the candidate description function includes modifying metadata associated with one or more of the model factor or the correction factor.

3. The method of claim 1, further comprising:
calculating a cost factor associated with modifying the candidate description function, wherein the cost factor indicates a change in a quantity of a combination of model factors and correction factors included in the candidate description function,
wherein generating the data summary cluster is responsive to determining that the cost factor indicates a positive cost reduction.

4. The method of claim 1, further comprising:
calculating a similarity of the first record and the second record; and
responsive to determining that the similarity of the first record and the second record exceeds a partitioning threshold, generating a partition of the set of binary records, wherein the partition includes the first record and the second record.

5. The method of claim 4, wherein the similarity is calculated as a Jaccard similarity.

6. The method of claim 4, wherein generating the partition is based on a locality sensitive hashing ("LSH") of the first record and the second record.

7. The method of claim 4, further comprising:
generating a respective repartitioning key for each of the first record and the second record, wherein generating the partition is based on each respective repartitioning key of the first record and the second record having a same value.

8. The method of claim 1, further comprising:
identifying an additional record from the set of binary records, the additional record having a further additional data element corresponding to the additional binary trait that is excluded from the respective binary traits;
modifying the candidate description function to include an additional correction factor that describes the further additional data element of the additional record; and
subsequent to modifying the candidate description function to include the correction factor and the additional correction factor and responsive to determining that each of the additional data element and the further additional data element correspond to the additional binary trait:
modifying the candidate description function to include an additional model factor that describes the additional data element and the further additional data element, and
modifying the candidate description function to omit the correction factor and the additional correction factor.

9. A system comprising one or more processors and a memory having stored thereon instructions that, upon execution by the one or more processors, cause the one or more processors to perform one or more operations, the system further comprising:
a datastore that includes a set of binary records, wherein each record in the set of binary records includes multiple data elements corresponding to binary traits; and
a cluster generation component that is configured for:
identifying, in a first record from the set of binary records, a first group of data elements that each include a first value, wherein each data element in the first group of data elements corresponds to a respective binary trait;
generating a candidate description function that describes the respective binary traits, wherein the candidate description function includes a model factor that describes the first group of data elements of the first record;
responsive to determining that a second record has a second group of data elements corresponding to the respective binary traits, wherein each data element in the second group of data elements includes the first value, modifying the candidate description function to indicate that the model factor further describes the second group of data elements of the second record;
responsive to determining that the second record has an additional data element corresponding to an additional binary trait that is excluded from the respective binary traits, wherein the additional data element includes the first value, modifying the candidate description function to include a correction factor that describes the additional data element of the second record;
generating a data summary cluster based on the modified candidate description function, wherein the data summary cluster includes a compact representation of the respective binary traits corresponding to the first group of data elements and the second group of data elements; and
providing the data summary cluster to a trait expansion query system that is configured for modifying the data summary cluster to identify an expansion trait associated with a subset of the set of binary records.

10. The system of claim 9, wherein modifying the candidate description function includes modifying metadata associated with one or more of the model factor or the correction factor.

11. The system of claim 9, the cluster generation component further configured for:
calculating a cost factor associated with modifying the candidate description function, wherein the cost factor indicates a change in a quantity of a combination of model factors and correction factors included in the candidate description function, wherein generating the data summary cluster is responsive to determining that the cost factor indicates a positive cost reduction.

12. The system of claim 9, further comprising a partitioning component that is configured for:
   calculating a similarity of the first record and the second record; and
   responsive to determining that the similarity of the first record and the second record exceeds a partitioning threshold, generating a partition of the set of binary records, wherein the partition includes the first record and the second record.

13. The system of claim 12, wherein the similarity is calculated as a Jaccard similarity.

14. The system of claim 12, wherein generating the partition is based on a locality sensitive hashing ("LSH") of the first record and the second record.

15. The system of claim 12, the partitioning component further configured for:
   generating a respective repartitioning key for each of the first record and the second record, wherein generating the partition is based on each respective repartitioning key of the first record and the second record having a same value.

16. The system of claim 9, the cluster generation component further configured for:
   identifying an additional record from the set of binary records, the additional record having a further additional data element corresponding to the additional binary trait that is excluded from the respective binary traits;
   modifying the candidate description function to include an additional correction factor that describes the further additional data element of the additional record; and
   subsequent to modifying the candidate description function to include the correction factor and the additional correction factor and responsive to determining that each of the additional data element and the further additional data element correspond to the additional binary trait:
      modifying the candidate description function to include an additional model factor that describes the additional data element and the further additional data element, and
      modifying the candidate description function to omit the correction factor and the additional correction factor.

17. A method performed by one or more computing devices, the method comprising:
   receiving, via a user interface, query data identifying (i) a seed population record selected from a group of population records and (ii) a target population trait;
   identifying, based on the seed population record and from a set of data summary clusters, a first data summary cluster and a second data summary cluster, wherein each of the first data summary cluster and the second data summary cluster includes a compact representation of the target population trait;
   responsive to determining that the first data summary cluster and the second data summary cluster include an overlapping set of data elements, modifying the first data summary cluster to include an additional data element from the second data summary cluster;
   identifying an expansion trait represented by the modified first data summary cluster;
   calculating, for each respective population record included in the group of population records, a score indicating a similarity of the expansion trait to a group of additional population traits associated with the respective population record; and
   updating a display device to display a graphical representation of each score associated with each respective population record.

18. The method of claim 17, wherein each data summary cluster in the set of data summary clusters is generated based on a respective description function that describes a subset of population traits associated with the group of population records, wherein the respective description function includes a model factor that describes a group of data elements included in multiple records of the group of population records.

19. The method of claim 17, further comprising, responsive to determining that the first data summary cluster and the second data summary cluster include the overlapping set of data elements, modifying the second data summary cluster to include a further additional data element from the first data summary cluster.

20. The method of claim 19, wherein subsequent to modifying the second data summary cluster to include the further additional data element from the first data summary cluster, clustering a duplicate data summary cluster from the modified first data summary cluster and the modified second data summary cluster.

* * * * *